United States Patent
Itagaki et al.

(10) Patent No.: US 11,257,178 B2
(45) Date of Patent: Feb. 22, 2022

(54) IMAGE PROCESSING DEVICE, IMAGE PROCESSING METHOD, AND STORAGE MEDIUM

(71) Applicants: FUJIFILM Corporation, Tokyo (JP); FUJIFILM Business Innovation Corp., Tokyo (JP)

(72) Inventors: Kazuyuki Itagaki, Tokyo (JP); Takashi Nagao, Kanagawa (JP)

(73) Assignees: FUJIFILM Corporation, Tokyo (JP); FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/803,884

(22) Filed: Feb. 27, 2020

(65) Prior Publication Data
US 2020/0202482 A1 Jun. 25, 2020

Related U.S. Application Data

(63) Continuation of application No. PCT/JP2018/028743, filed on Jul. 31, 2018.

(30) Foreign Application Priority Data

Aug. 30, 2017 (JP) .............................. JP2017-165510

(51) Int. Cl.
*G06T 1/20* (2006.01)
*G06T 7/38* (2017.01)
(Continued)

(52) U.S. Cl.
CPC .................. *G06T 1/20* (2013.01); *G06T 1/60* (2013.01); *G06T 3/4015* (2013.01); *G06T 7/38* (2017.01)

(58) Field of Classification Search
CPC .... G06T 1/20; G06T 7/38; G06T 1/60; G06T 3/4015; G06F 9/48; G06F 9/50
See application file for complete search history.

(56) References Cited

U.S. PATENT DOCUMENTS

2008/0303833 A1* 12/2008 Swift ........................ G06T 1/20
345/505
2013/0257882 A1* 10/2013 Ooguni ..................... G06T 1/20
345/505
(Continued)

FOREIGN PATENT DOCUMENTS

JP H03-246746 A 11/1991
JP H04-172570 A 6/1992
(Continued)

OTHER PUBLICATIONS

Mark Grand; "Patterns in Java, vol. 1: A Catalog of Reusable Design Patterns Illustrated with UML" Feb. 17, 2003; pp. 495 to 500; 2nd Edition; Wiley Publishing, Inc.
(Continued)

*Primary Examiner* — Jennifer Mehmood
*Assistant Examiner* — Donna J. Ricks
(74) *Attorney, Agent, or Firm* — Studebaker & Brackett PC

(57) ABSTRACT

A computer including a subdividing section subdividing image data into plural subdivided image data, a control section that causes each of plural cores included a first processing unit to execute in parallel tasks on the subdivided image data, the tasks enabled for processing according to their precedence dependency relationship, a registration section that, if a task is executable by a second processing unit asynchronously with respect to the first processing unit, register a finish detection task to detect completion of the task on the second processing unit in a list after causing a core of the first processing unit to execute an execution
(Continued)

instruction task instructing execution of the task on the second processing unit, and a determination section that accesses the list and to determine whether or not there is a completed finish detection task.

11 Claims, 18 Drawing Sheets

(51) Int. Cl.
*G06T 1/60* (2006.01)
*G06T 3/40* (2006.01)

(56) References Cited

U.S. PATENT DOCUMENTS

| | | | | |
|---|---|---|---|---|
| 2015/0205632 | A1* | 7/2015 | Gaster | G06F 9/4856 718/102 |
| 2018/0165786 | A1* | 6/2018 | Bourd | G06T 15/005 |

FOREIGN PATENT DOCUMENTS

| | | | |
|---|---|---|---|
| JP | 2004-030321 A | 1/2004 | |
| JP | 2010-146055 A * | 7/2010 | ............... G06T 1/20 |

OTHER PUBLICATIONS

Rajat P. Garg et al.; "Techniques for Optimizing Applications: High Performance Computing"; Sun microsystems; Jun. 2001; pp. 394 to 395; Revision 01, Part No. 806-6380-10.
International Search Report issued in PCT/JP2018/028743; dated Nov. 6, 2018.
Written Opinion of the ISA issued in PCT/JP2018/028743; dated Nov. 6, 2018.
Written Opinion of the IPEA issued in PCT/JP2018/028743; dated Sep. 10, 2019.
International Preliminary Report on Patentability issued in PCT/JP2018/028743; completed Nov. 20, 2019.
An Office Action; "Notice of Reasons for Refusal", mailed by the Japanese Patent Office dated Apr. 20, 2021, which corresponds to Japanese Patent Application No. 2019-539104 and is related to U.S. Appl. No. 16/803,884; with English language translation.

* cited by examiner

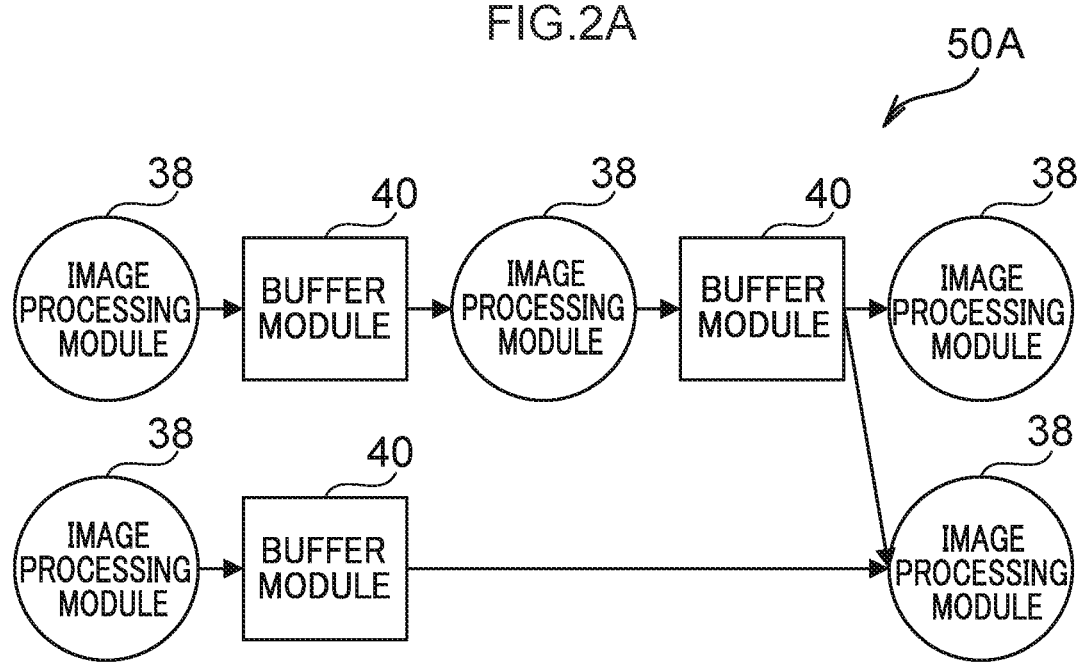

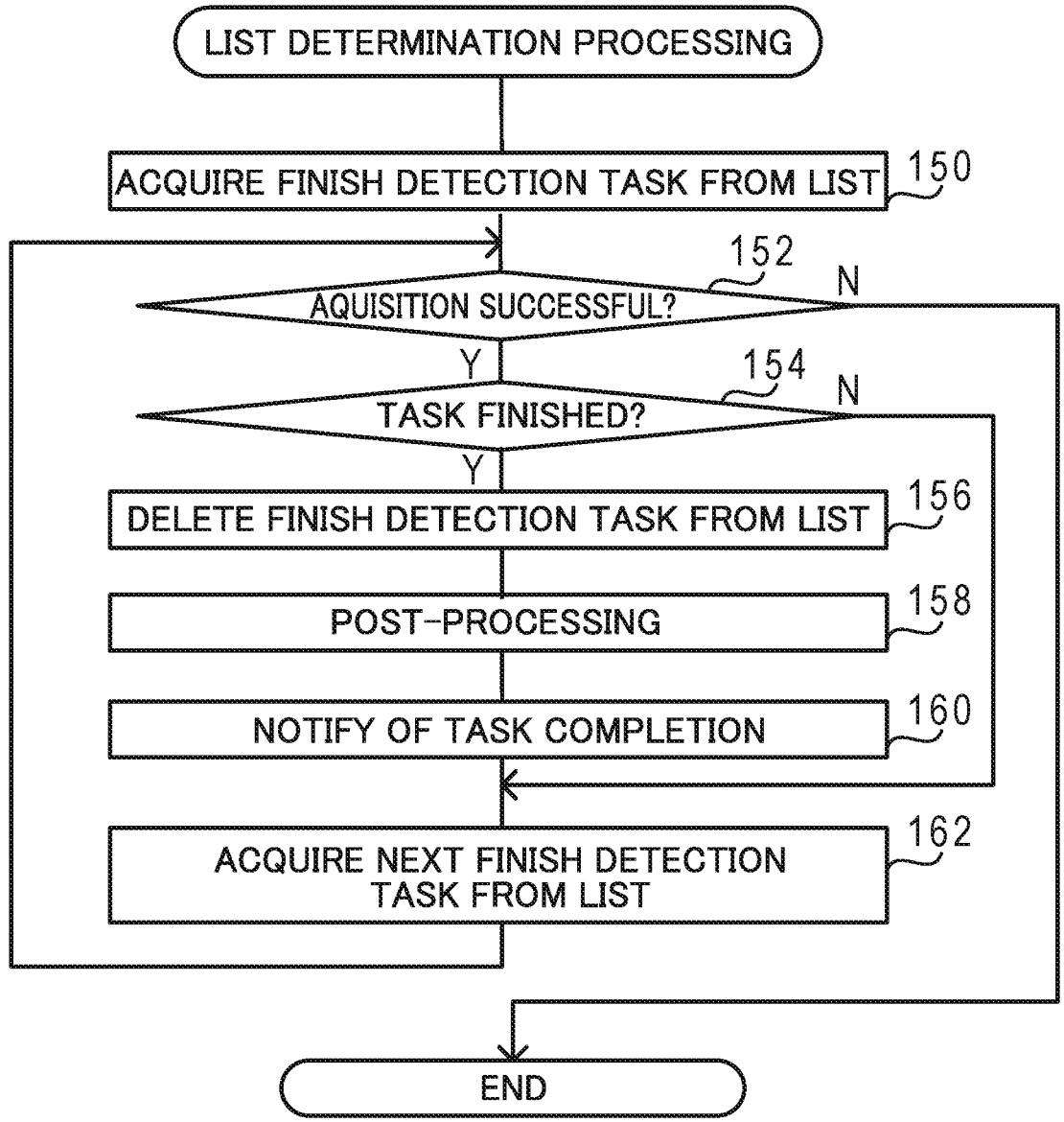

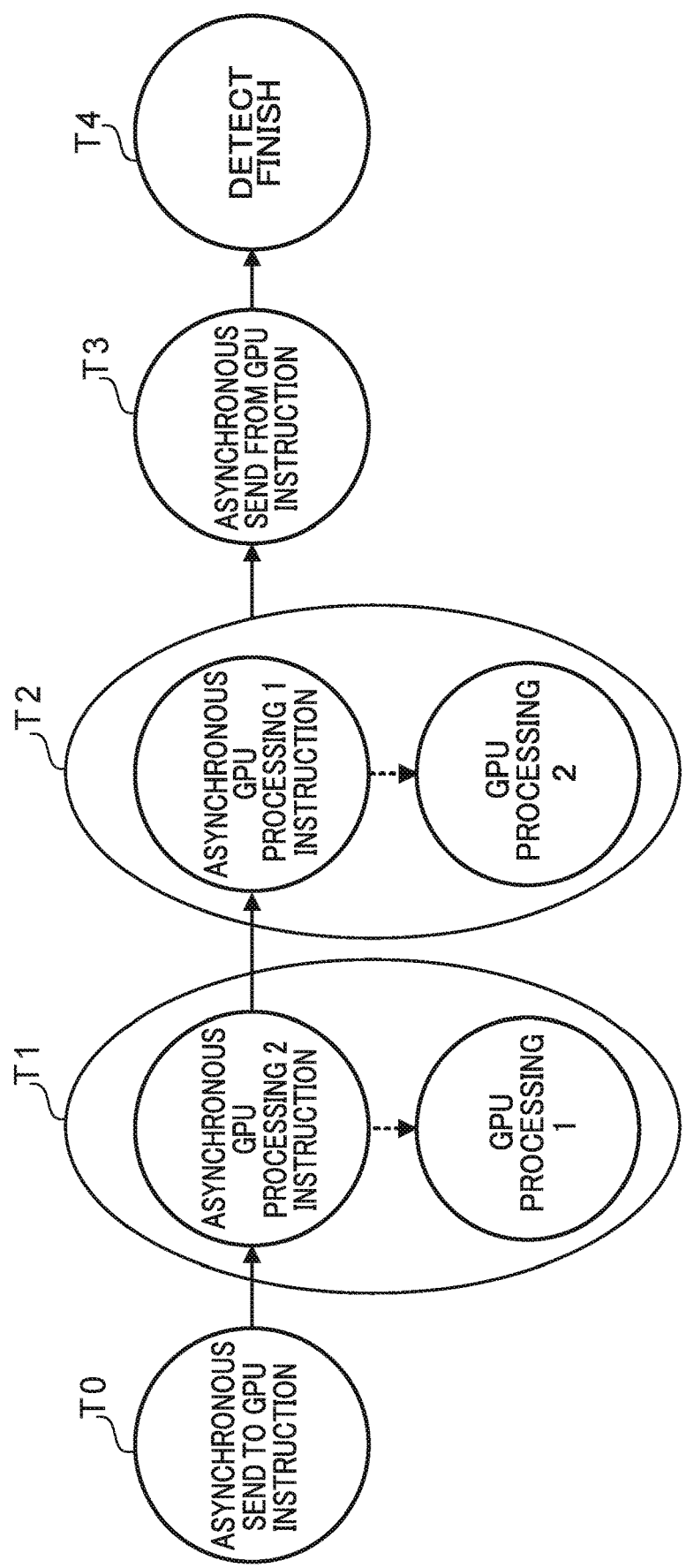

ize Processing Device, Image Processing Method, and Storage Medium

CROSS-REFERENCE TO RELATED APPLICATIONS

This application is a continuation application of International Application No. PCT/JP2018/028743, filed on Jul. 31, 2018, which is incorporated herein by reference in its entirety. Further, this application claims priority from Japanese Patent Application No. 2017-165510, filed on Aug. 30, 2017, the disclosure of which is incorporated by reference herein in its entirety.

TECHNICAL FIELD

The present disclosure relates to an image processing device, an image processing method, and a non-transitory storage medium storing an image processing program.

RELATED ART

A control method is disclosed in Japanese Patent Application Laid-Open (JP-A) No. 2004-030312, which realizes faster speeds of processing by allocating one series of processing to plural threads (arithmetic logic units) to perform simultaneous processing while synchronizing the plural threads.

Technologies in which a task producer feeds a task that had been introduced to a queue to a task consumer using plural worker threads are also disclosed in "Patterns in Java" by Mark Grand published in A Catalog of Reusable Design Patterns Illustrated with UML 2nd Edition, Vol. 1 of Wiley Publications, 2003 Feb. 17, pages 495 to 500, and in "Techniques for Optimizing Applications" by Rajat P. Gang and Ilya Sharapov published in High Performance Computing by Prentice-Hall, 2001 Jul. 25, pages 394 to 395.

In the technologies disclosed in JP-A No. 2004-030312 and the above technical documents, when a sub-processing routine is executed in a second processing unit under instruction from a first processing unit asynchronously with respect to the first processing unit that mainly performs the sub-processing routines, there may be cases in which the detection of the completion of the sub-processing routine in the second processing unit is not performed efficiently. In such cases, even though the sub-processing routine has been completed, a new sub-processing routine is not able to be performed in the second processing unit until the completion of the sub-processing routine is detected. This may result in not being able to sufficiently utilize the second processing unit and lead to a drop in the processing efficiency of image processing.

SUMMARY

The present disclosure provides an image processing device, an image processing method, and a non-transitory storage medium storing an image processing program that enables faster speeds of image processing due to performing detection of the completion of a sub-processing routine in the second processing unit more efficiently.

A first aspect of the present disclosure is an image processing device configured to execute image processing using respective objects in an object group of plural connected objects for executing image processing arranged in a directed acyclic graph pattern, the image processing device including: a subdividing section configured to subdivide image data subject to the image processing into plural subdivided image data; a control section configured to control each of plural arithmetic logic units included in a first processing unit so as to execute, in parallel, a sub-processing routine of the image processing to be performed on the subdivided image data, one or more sub-processing routines being included in an object, and the sub-processing routine being enabled for processing according to a precedence dependency relationship of the one or more sub-processing routines; a registration section configured to, in a case in which a sub-processing routine that is an asynchronous processing routine to be performed asynchronously with respect to the first processing unit and that is associated with a finish detection task for detecting completion of the sub-processing routine is executable by a second processing unit, after causing an arithmetic logic unit of the first processing unit to execute an execution instruction task instructing execution of the sub-processing routine at the second processing unit, register a finish detection task associated with the sub-processing routine of which execution has been instructed via finish detection task management information; and a determination section configured to access the finish detection task management information and to determine whether or not there is a completed finish detection task associated with a sub-processing routine of which the second processing unit has completed execution.

In a second aspect of the present disclosure, the first aspect may be configured wherein one of the plural arithmetic logic units operates as the determination section after executing the sub-processing routine.

In a third aspect of the present disclosure, the second aspect may be configured wherein after determining, as the determination section, whether or not there is a completed finish detection task, the one of the plural arithmetic logic units executes another sub-processing routine under control by the control section.

In a fourth aspect of the present disclosure, the above aspects may be configured wherein one of the plural arithmetic logic units operates as the registration section.

In a fifth aspect of the present disclosure, the above aspects may be configured wherein one of the plural arithmetic logic units successively operates as the registration section and as the determination section.

In a sixth aspect of the present disclosure, the first aspect may be configured wherein the control section causes one of the plural arithmetic logic units to execute a determination task so that the one of the arithmetic logic units operates as the determination section.

In a seventh aspect of the present disclosure, the above aspects may be configured wherein the control section performs exclusive control on access by the registration section and the determination section to the finish detection task management information.

In an eighth aspect of the present disclosure, the above aspects may be configured wherein the determination section deletes the completed finish detection task from the finish detection task management information.

In a ninth aspect of the present disclosure, the above aspects may be configured wherein the control section causes the plural arithmetic logic units to fetch one or more sub-processing routines stored in a task queue in sequence and to execute the one or more sub-processing routines in parallel.

A tenth aspect of the present disclosure is an image processing method performed by an image processing device configured to execute image processing using respective objects in an object group of plural connected objects for executing image processing arranged in a directed acyclic graph pattern, the image processing method including: subdividing image data subject to the image processing into plural subdivided image data; executing, in parallel, by each of plural arithmetic logic units included in a first processing unit, a sub-processing routine of the image processing to be performed on the subdivided image data, one or more sub-processing routines being included in an object, and the sub-processing routine being enabled for processing according to a precedence dependency relationship of the one or more sub-processing routines; in a case in which a sub-processing routine that is an asynchronous processing routine to be performed asynchronously with respect to the first processing unit and that is associated with a finish detection task for detecting completion of the sub-processing routine is executable by a second processing unit, after causing an arithmetic logic unit of the first processing unit to execute an execution instruction task instructing execution of the sub-processing routine at the second processing unit, registering a finish detection task associated with the sub-processing routine of which execution has been instructed via finish detection task management information; and accessing the finish detection task management information and determining whether or not there is a completed finish detection task associated with a sub-processing routine of which the second processing unit has completed execution.

An eleventh aspect of the present disclosure is a non-transitory storage medium storing an image processing program that causes a computer to perform image processing using respective objects in an object group of a plurality of connected objects for executing image processing arranged in a directed acyclic graph pattern, the image processing including: subdividing image data subject to the image processing into plural subdivided image data; executing in parallel, by each of plural arithmetic logic units included in a first processing unit, a sub-processing routine of the image processing to be performed on the subdivided image data, one or more sub-processing routines being included in an object, and the sub-processing routine being enabled for processing according to a precedence dependency relationship of the one or more sub-processing routines; in a case in which a sub-processing routine that is an asynchronous processing routine to be performed asynchronously with respect to the first processing unit and that is associated with a finish detection task for detecting completion of the sub-processing routine is executable by a second processing unit, after causing an arithmetic logic unit of the first processing unit to execute an execution instruction task instructing execution of the sub-processing routine at the second processing unit, registering a finish detection task associated with the sub-processing routine of which the execution has been instructed via finish detection task management information; and accessing the finish detection task management information and determining whether or not there is a completed finish detection task associated with a sub-processing routine of which the second processing unit has completed execution.

A twelfth aspect of the present disclosure is an image processing device configured to execute image processing using each object in an object group of plural connected objects for executing image processing arranged in a directed acyclic graph pattern. The image processing device includes a processor configured to subdivide image data subject to the image processing into plural subdivided image data, and control each of plural arithmetic logic units provided in a first processing unit so as to execute in parallel sub-processing routines of the image processing to be performed on the subdivided image data, the sub-processing routines being enabled for processing according to a precedence dependency relationship. The processor is further configured to, in cases in which a sub-processing routine is executable by a second processing unit asynchronously with respect to the first processing unit, after an execution instruction task to instruct execution of the sub-processing routine on the second processing unit has been executed on an arithmetic logic unit of the first processing unit, register a finish detection task to detect completion of the sub-processing routine on the second processing unit in finish detection task management information, and access the finish detection task management information to determine presence or absence of the finish detection task for which the second processing unit has completed the sub-processing routine.

EFFECTS OF DISCLOSURE

The above aspects of the present disclosure are capable of providing an image processing device, an image processing method, and a non-transitory storage medium storing an image processing program that increase the speed of image processing by detecting completion of a sub-processing routine in the second processing unit more efficiently.

BRIEF DESCRIPTION OF DRAWINGS

FIG. 2A is a schematic diagram illustrating an example of an image processing DAG.

FIG. 12 is a flowchart illustrating a flow of asynchronous processing finish detection task list determination processing according to the first exemplary embodiment.

FIG. 13C is a schematic diagram illustrating an example of a flow of processing in a case in which processing is performed by the second processing unit (GPU) asynchronously with respect to the core of the first processing unit.

DETAILED DESCRIPTION

Explanation follows regarding details of exemplary embodiments to implement the present disclosure, with reference to the drawings.

First Exemplary Embodiment

Figure 1:
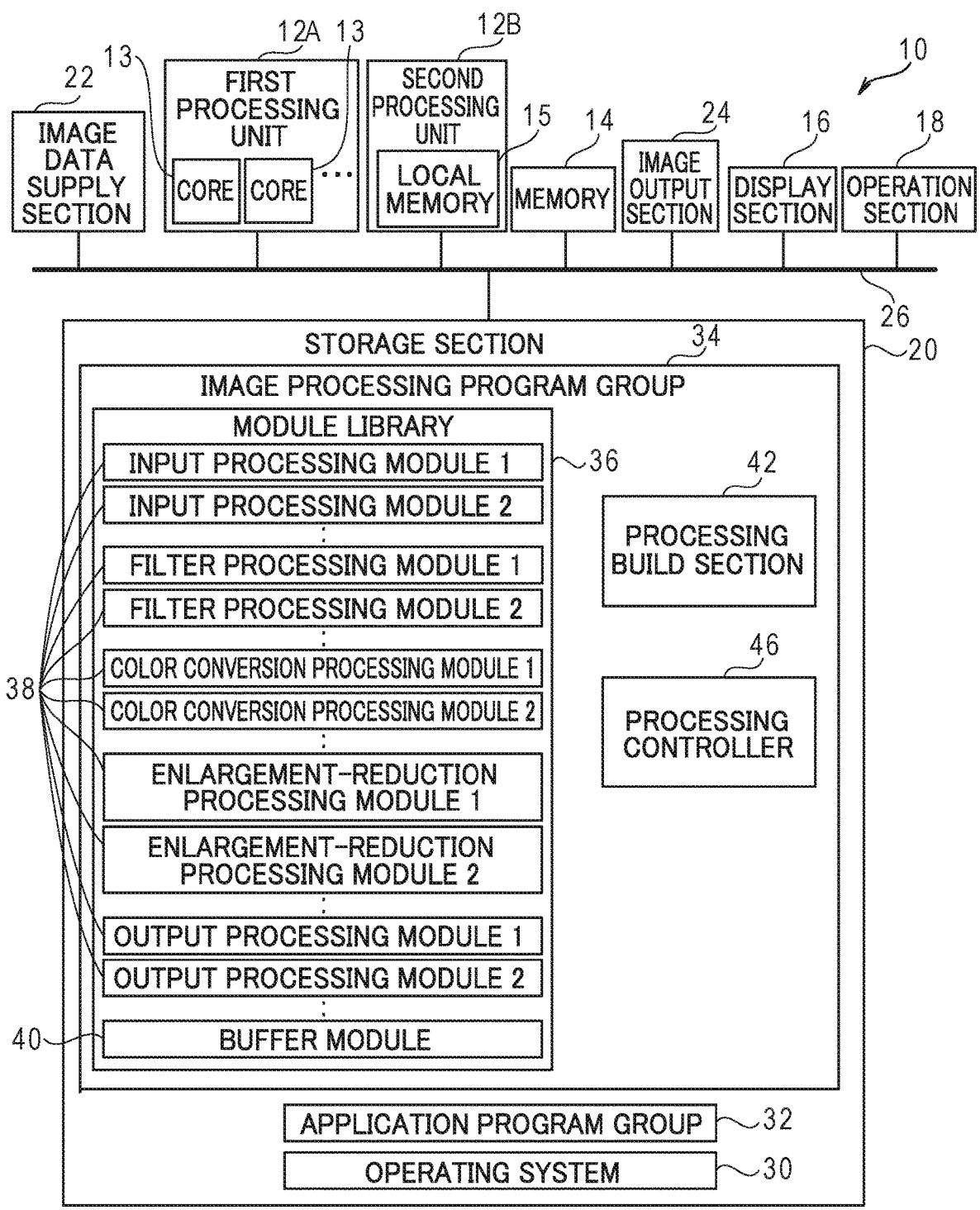
FIG. 1 is a block diagram illustrating an example of a configuration of a computer that functions as an image processing device according to a first exemplary embodiment.

Explanation first follows regarding a configuration of a computer 10 that functions as an image processing device, with reference to FIG. 1. Note that the computer 10 may be a computer incorporated in an image handing machine in which image processing is performed, such as a copier, printer, facsimile machine, multifunction machine including multi-functionality for these devices, scanner, etc. The computer 10 may also be a standalone computer, such as a personal computer (PC), or a computer incorporated in a portable machine such as a personal digital assistant (PDA), a mobile phone or the like.

As illustrated in FIG. 1, the computer 10 of the present exemplary embodiment includes a first processing unit 12A, a second processing unit 12B, memory 14, a display section 16, an operation section 18, a storage section 20, an image data supply section 22, and an image output section 24. The first processing unit 12A, the second processing unit 12B, the memory 14, the display section 16, the operation section 18, the storage section 20, the image data supply section 22, and the image output section 24 are each connected together through a bus 26.

The first processing unit 12A according to the present exemplary embodiment is a main processor of the computer 10, and is, for example, a central processing unit (CPU) including plural processor cores 13 (hereafter referred to as "cores 13"). In the following explanation an alphabet suffice will be appended to reference numerals when discriminating in the description between each of the cores 13, i.e. a core 13A and a core 13B. The cores 13 of the present exemplary embodiment are examples of arithmetic logic units of the present disclosure.

The second processing unit 12B according to the present exemplary embodiment is, for example, a graphics processing unit (GPU) including internal local memory 15. As long as the second processing unit 12B is a processing unit that includes internal memory such as the local memory 15 or the like, and that performs image processing on image data stored in the internal memory, the second processing unit 12B is not particularly limited and may be a CPU, for example. The second processing unit 12B may also be a GPU inbuilt to the first processing unit 12A. Alternatively, the first processing unit 12A and the second processing unit 12B may be arithmetic logic units such as field programmable gate arrays (FPGA).

The memory 14 is a non-volatile storage device to enable the first processing unit 12A to temporarily store data therein. When image processing is performed by the second processing unit 12B according to the present exemplary embodiment, the first processing unit 12A sends image data stored in the memory 14 or in a storage area of the storage section 20 to the second processing unit 12B through the bus 26. The second processing unit 12B stores the image data sent from the first processing unit 12A in the local memory 15, and performs image processing on the stored image data.

In cases in which the computer 10 is incorporated in an image handing machine as described above, for example, a display panel such as a liquid crystal display (LCD) or a ten key etc. provided to the image handing machine are employed as the display section 16 and the operation section 18. In a case in which the computer 10 is a standalone computer, for example, a display, and a keyboard, mouse, or the like connected to the computer 10 may be employed as the display section 16 and the operation section 18. Alternatively, a touch panel display configured by integrating a touch panel and a display together may be employed as the display section 16 and the operation section 18. A non-volatile storage medium, such as a hard disk drive (HDD), solid state drive (SSD), or flash memory may be employed as the storage section 20.

As long as the image data supply section 22 is able to supply image data to be processed, the image data supply section 22 may, for example, be an image reader that reads an image recorded on a recording material such as paper, photographic film, or the like, and output image data. Alternatively, the image data supply section 22 may, for example, be a reception unit that receives the image data from an external device over a communication line, an image storage section (the memory 14 or the storage section 20) that stores the image data on, and the like.

As long as the image output section 24 is able to output an image data resulting from image processing, or an image represented by image data resulting from image processing, the image output section 24 may, for example, be an image recording section that records an image represented by the image data on a recording material such as paper or a photosensitive material. Alternatively, the image output section 24 may be a display section (the display section 16) configured to display an image represented by the image data on a display etc., or a writing unit configured to write the image data to a recording medium such as a compact disk read only memory (CD-ROM). The image output section 24 may be a transmission section configured to transmit image data resulting from image processing to an external device over a communication line. Alternatively, the image output section 24 may be an image storage section (the memory 14 or the storage section 20) configured to store the image data resulting from image processing.

As illustrated in FIG. 1, various programs to be executed by the first processing unit 12A and the second processing unit 12B are stored in the storage section 20. The various programs stored on the storage section 20 include an operating system 30 program to manage resources, manage program execution, and to control communications between the computer 10 and external devices. The various programs stored on the storage section 20 also include an image processing program group 34 that causes the computer 10 to function as an image processing device. The various programs stored on the storage section 20 also include a set of application programs 32 (hereafter referred to as "application 32") that perform desired image processing on the image processing device.

The image processing program group 34 is a set of programs developed with the aim of reducing the load incurred when developing an image processing program to be executed by an image handing machine, mobile device, PC, or the like, as mentioned above. The image processing program group 34 is a set of programs developed so as to be commonly executable across various devices (platforms) such as the image handing machine, mobile device, PC, or the like, as mentioned above.

According to a build instruction from the application 32, the image processing device realized by the image processing program group 34 builds an image processing directed acyclic graph (DAG) 50A to perform image processing instructed by the application 32, the details of which are described later. The image processing device then executes processing of the image processing DAG 50A according to an execution instruction from the application 32. The image processing program group 34 accordingly provides an interface to the application 32 in order to instruct building of the image processing DAG 50A to perform image processing as desired, and in order to instruct image processing execution by the built image processing DAG 50A.

Due to adopting the configuration described above, even in cases in which there is a new development of a given device that requires image processing to be performed therein, in relation to the development of a program to perform such image processing, it is sufficient to develop the application 32 that utilizes the above interface to perform the image processing required for the given device using the image processing program group 34. This eliminates a need for a developer to newly develop a program to perform the image processing, reducing the load on the developer.

Next, detailed description follows regarding the image processing program group 34 according to the present exemplary embodiment. As illustrated in FIG. 1, the image processing program group 34 includes a module library 36, a program for a processing build section 42, and a program for a processing controller 46.

The module library 36 is registered with each program of plural types of image processing module 38 that perform predetermined mutually different image processing. Examples of such image processing include input processing, filter processing, color conversion processing, enlargement-reduction processing, skew angle detection processing, image rotation processing, image synthesis processing, output processing, and the like.

Image processing modules 38 for the same type of image processing but having different content for the image processing to be executed are registered in the module library 36. In FIG. 1 the type of image processing module are appended with numerical suffices to discriminate as "module 1" and "module 2". For example, for enlargement-reduction processing, an image processing module 38 may be prepared that thins out every other pixel from the input image data in both the horizontal direction and the vertical direction so as to perform reduction processing to reduce the vertical and horizontal size of the image by 50%. Furthermore, for enlargement-reduction processing for example, an image processing module 38 may be prepared that performs enlargement-reduction processing on input image data at an instructed enlargement-reduction ratio.

Moreover, for color conversion processing for example, an image processing module 38 that converts an image in red green blue (RGB) color space into an image in cyan magenta yellow key-plate (black) (CMYK) color space, and an image processing module 38 that converts an image in cyan magenta yellow key-plate (black) (CMYK) color space into an image in red green blue (RGB) color space, may be prepared. Furthermore, for example, for color conversion processing, an image processing module 38 that converts an image in red green blue (RGB) color space into an image in YCbCr color space, and an image processing module 38 that converts an image in YCbCr color space into an image in red green blue (RGB) color space, may be prepared.

A buffer module 40 provided with a storage area (buffer) for storing image data is also registered in the module library 36.

Under instruction from the application 32, the processing build section 42 of the present exemplary embodiment builds an image processing DAG 50A arranged in a DAG pattern. In the image processing DAG 50A, as illustrated in the example in FIG. 2A, one or more image processing module 38 is connected through a buffer module 40 that is disposed at least at a proceeding stage or at a following stage of the individual image processing modules 38.

Note that the individual image processing modules 38 are examples of objects that execute image processing on the input image data. Moreover, in an example illustrated in FIG. 2A, an image processing module 38 connected to a proceeding stage image processing module 38 through a buffer module 40 is able to execute its own image processing only when the image processing by the proceeding stage image processing module 38 has been completed. Moreover, an image processing module 38 having plural proceeding stage image processing modules 38 connected thereto through buffer modules 40 is able to execute its own image processing only when the image processing in all of the plural proceeding stage image processing modules 38 has been completed.

Figure 2B:
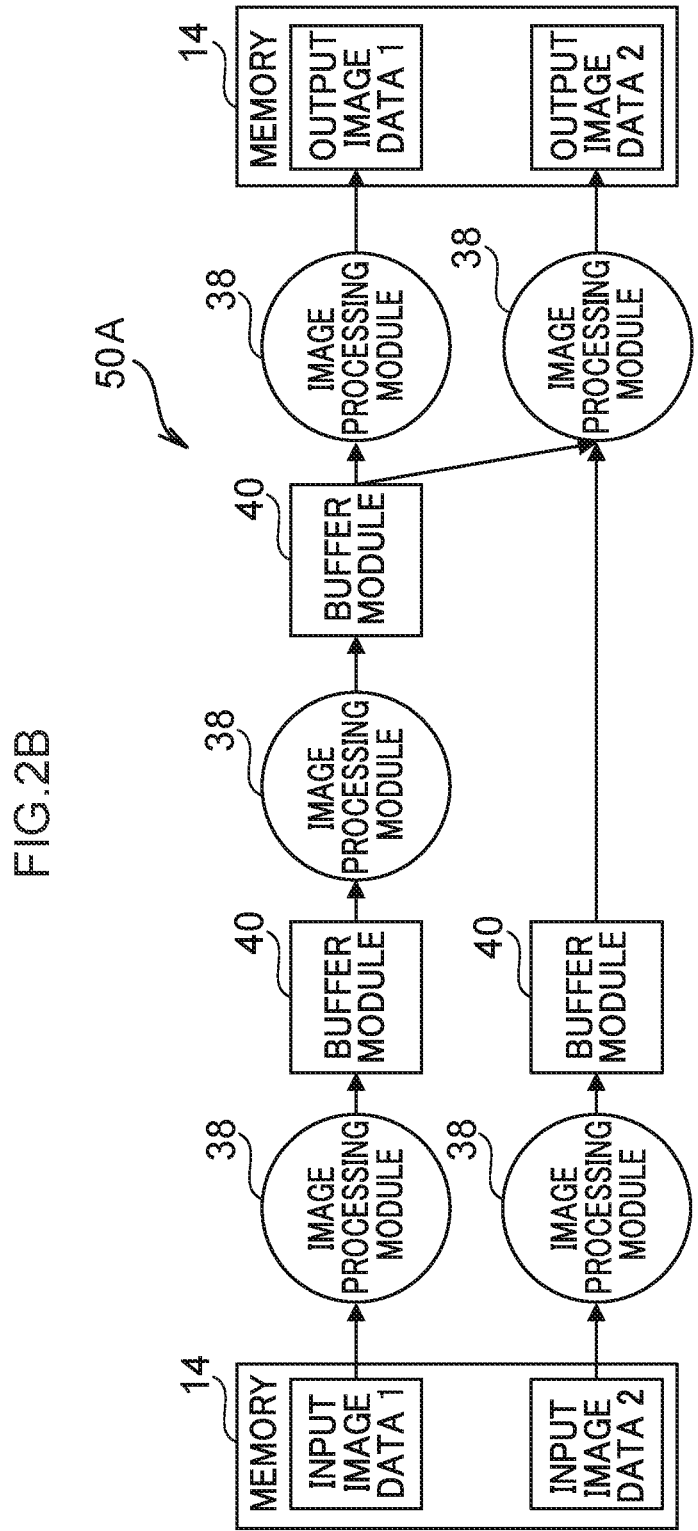
FIG. 2B is a schematic diagram illustrating an example of a case in which memory for input and output has been added to the image processing DAG.

Although FIG. 2A illustrates a DAG containing only each module connected together in processing sequence, when this DAG is executed, image processing is performed according to the DAG after input image data stored in the memory 14 has been input, as illustrated in FIG. 2B. Processing results, such as processed output image data is finally stored in the memory 14.

Figure 3:
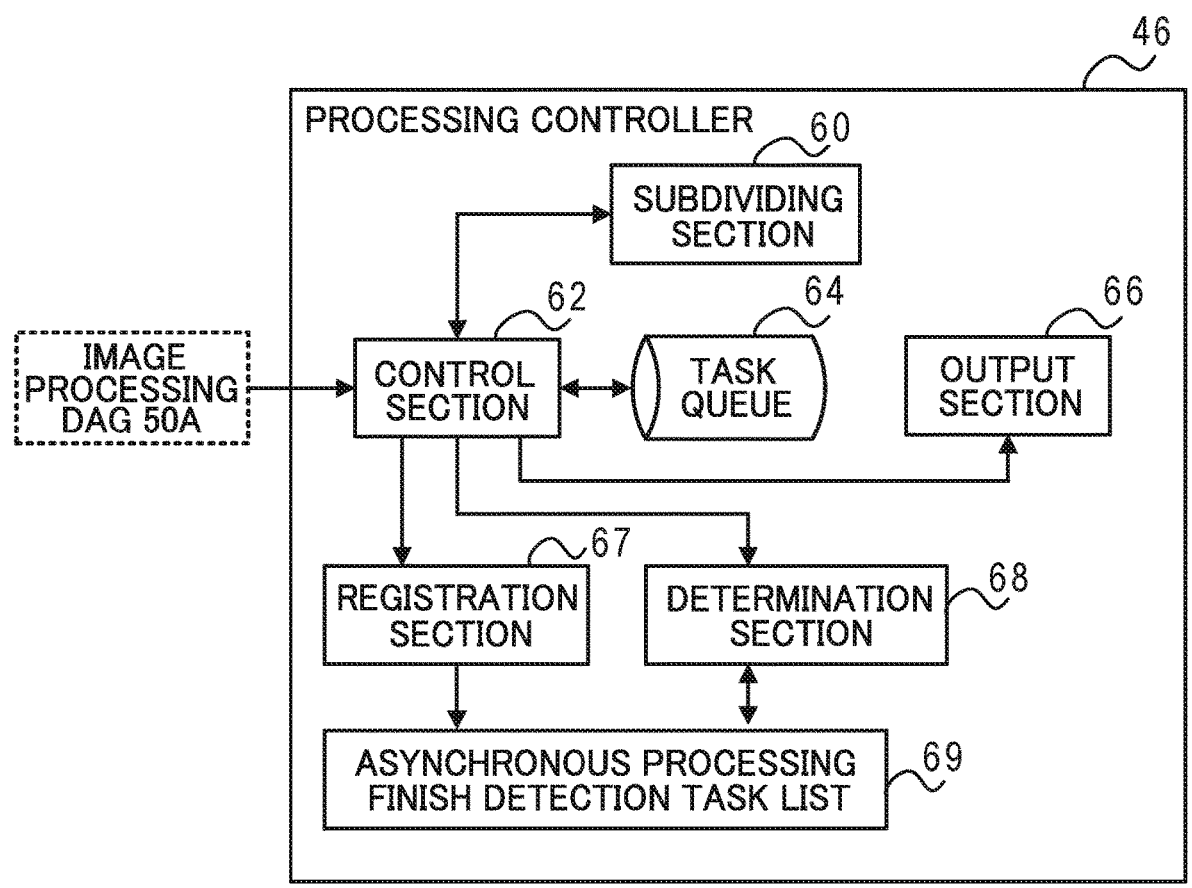
FIG. 3 is a block diagram illustrating an example of a functional configuration of a processing controller according to the first exemplary embodiment.

Next, description follows regarding a functional configuration of the processing controller 46 according to the present exemplary embodiment, with reference to FIG. 3. As illustrated in FIG. 3, the processing controller 46 includes a subdividing section 60, a control section 62, a task queue 64, an output section 66, a registration section 67, a determination section 68, and an asynchronous processing finish detection task list (hereafter referred to simply as "list") 69.

The subdividing section 60 according to the present exemplary embodiment subdivides an image represented by parts of the input image data to be processed into plural segments (hereafter referred to as a "subdivided image"). As illustrated by the example in FIG. 4A, the subdividing section 60 subdivides the image G represented by parts of the input image data to be processed into plural (three in the example illustrated in FIG. 4A) subdivided images B1 to B3. Note that image data representing a subdivided image is hereafter referred to as "subdivided image data". In image processing that is performed on the whole of an input image, such as color conversion processing, a part of the input image data to be processed means the whole of the input image data. Alternatively, in image processing that is performed on a portion of the input image, such as in trimming processing, a part of the input image data to be processed means the portion of the input image. To avoid confusion in the following, a part of the input image data to be processed is referred to simply as "input image data".

Figure 4A:
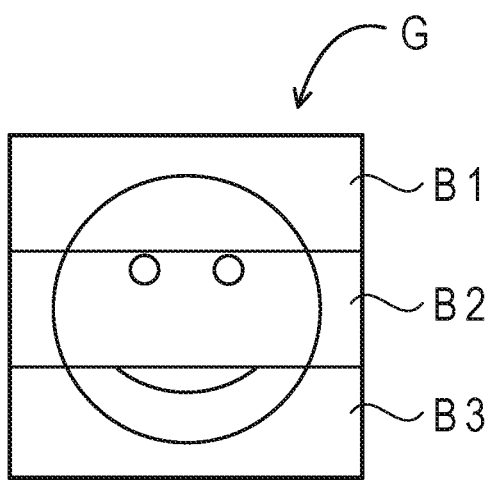
FIG. 4A is a schematic diagram to explain an example of subdividing processing for an input image.
Figure 4B:
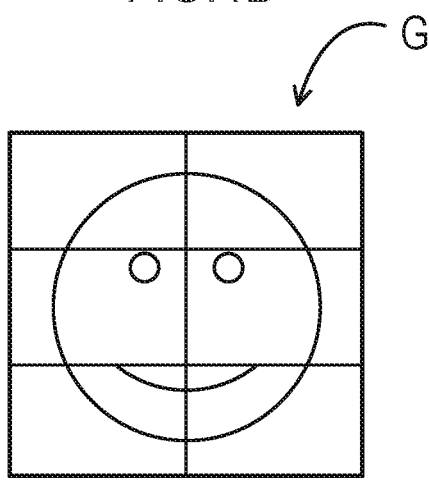
FIG. 4B is a schematic diagram to explain an example of subdividing processing for the input image.

In the example illustrated in FIG. 4A, the subdividing section 60 subdivides the face-on image G heightwise, however there is no limitation thereto. For example, the subdividing section 60 may subdivide the face-on image G widthwise, or may subdivide the face-on image G both heightwise and widthwise as illustrated in FIG. 4B.

There is no particular limitation to the number of subdivisions made to the input image data by the subdividing section 60. For example, the subdividing section 60 may subdivide the input image data into divisions of a predetermined number or size. Moreover, the subdividing section 60 may, for example, subdivide the input image data into divisions of a number of two or more that does not exceed a number of processors/cores in a processing unit for executing image processing with the image processing module 38.

The subdividing section 60 may, for example, subdivide the input image data into divisions of a size not exceeding the capacity of a cache memory included in a processing unit for executing the image processing of the image processing module 38. An example of such a case is an embodiment in which the subdividing section 60 subdivides the input image data into divisions of a size that matches as closely as possible the capacity of a last level cache (LLC), which is a level of cache memory furthest away from a processor of the processing unit executing the image processing of the image processing module 38, while not exceeding the capacity of the LLC.

The control section 62 according to the present exemplary embodiment performs control so as to execute tasks corresponding to the subdivided image data in parallel on the plural cores 13. Note that in parallel means that tasks that have become executable according to dependency relationships are executed in parallel (at the same time) on plural cores 13.

Figure 5:
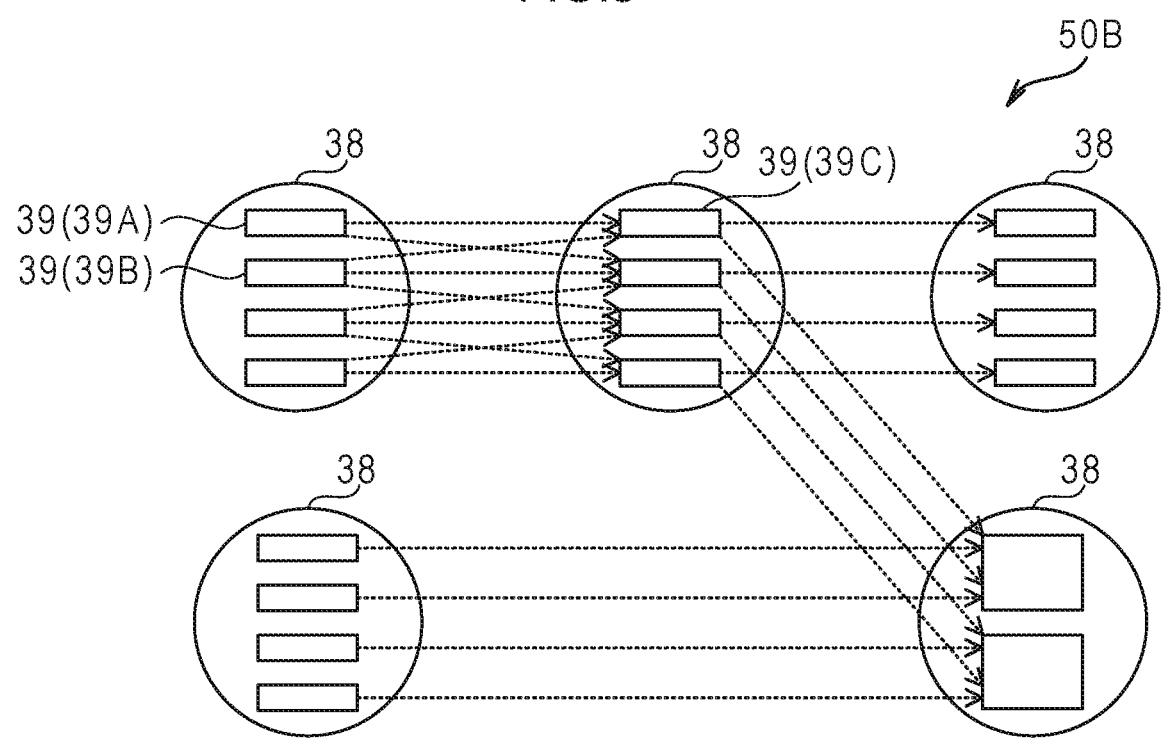
FIG. 5 is a schematic diagram illustrating an example of an image processing DAG in which an image processing module has been subdivided into sub-processing routines.

More specifically, as illustrated in the example FIG. 5, the control section 62 subdivides image processing to be executed by each of the image processing modules 38 in the image processing DAG 50A into sub-processing routines 39 corresponding to respective sets of subdivided image data (i.e., the subdivided image data that has been subdivided by the subdividing section 60), and updates the image processing DAG 50A to an image processing DAG 50B. Note that the image processing DAG 50B represents a DAG of sub-processing routines 39 serving as tasks, which is a so-called task DAG.

FIG. 5 illustrates the image processing DAG 50B for a case in which the input image data for the image processing DAG 50A illustrated in FIG. 2A has been subdivided into four subdivisions of subdivided image data. In FIG. 5, the buffer modules 40 are omitted from illustration to avoid confusion.

The control section 62 according to the present exemplary embodiment appends dependency relationships between a sub-processing routine 39 of the proceeding-stage-connected image processing module 38 and a sub-processing routine 39 of the following-stage-connected image processing module 38, with the dependency relationships depending on the type of image processing to be executed by image processing modules 38. These dependency relationships are illustrated by the broken line arrows in FIG. 5.

For example, in processing that perform image processing only on pixels subject to the processing, such as color conversion processing, there is a one-to-one dependency relationship for each of the sub-processing routines 39. However, in image processing that needs surrounding pixels to the pixel subject to the processing, such as filter processing, a dependency relationship to each of the proceeding stage sub-processing routines 39 that perform image processing on the surrounding pixels is also appended. Namely, this dependency relationship is a relationship between connected image processing modules 38 in which the sub-processing routine 39 of the following-stage-connected image processing module 38 becomes executable only when the sub-processing routine 39 of the proceeding-stage-connected image processing module 38 has been completed. Thus, each of the sub-processing routines 39 is executable only when there is no sub-processing routine 39 appended with a dependency relationship in the proceeding stage, or only when all of the sub-processing routines 39 appended with a dependency relationship in the proceeding stage have been completed.

More specifically, for example, a sub-processing routine 39A and a sub-processing routine 39B illustrated in FIG. 5 both are executable at the start of image processing execution. However, the sub-processing routine 39C illustrated in FIG. 5 for example only becomes executable when processing has been completed in both the proceeding stage sub-processing routine 39A and the proceeding stage sub-processing routine 39B appended with dependency relationships to the sub-processing routine 39C.

In the present exemplary embodiment the sub-processing routine 39 corresponding to the subdivided image data is called a "task".

The control section 62 stores tasks that are executable in a task queue 64 so that the stored tasks are fetched in sequence and executed by the plural cores 13. The control section 62 of the present exemplary embodiment controls such that the number of tasks stored at the same time in the task queue 64 is at most two, for example.

Note that although the number of tasks stored at the same time in the task queue 64 is not limited in the present exemplary embodiment, the number is preferably two or more. If a configuration is adopted in which only one task is stored in the task queue 64, then a new task would not be stored in the task queue 64 until execution of that task is complete, which would result in an increase in the number of non-operational cores 13 among the plural cores 13, leading to a reduction in the utilization ratio of the cores 13. However, is a configuration is adopted in which there is no limit to the number of tasks the task queue 64 is able to store at the same time, then a large memory capacity would need to be secured in order to secure memory for pre-processing (described in detail later) for all of the tasks stored in the task queue 64.

Thus, by limiting the number of tasks the task queue 64 is able to store at the same time, an increase in the amount of resource such as memory secured for pre-processing is suppressed. Therefore, the number of tasks the task queue 64 is able to store at the same time may be determined according to memory capacity, or may be varied according to the utilization ratio of the cores 13.

There are two types of task in the present exemplary embodiment, synchronous tasks and asynchronous tasks. The synchronous tasks are tasks in which, once the core 13A instructs the core 13B or the second processing unit 12B to executed processing, control is not returned to the core 13A until the processing has been completed in the core 13B or the second processing unit 12B. The asynchronous tasks are tasks in which, once the core 13A instructs the core 13B or the second processing unit 12B to execute processing, control is returned to the core 13A without waiting until the processing has been completed in the core 13B or in the second processing unit 12B.

The control section 62 causes the cores 13 or the second processing unit 12B to acquire a task the task queue 64 and causes the cores 13 or the second processing unit 12B to execute the acquired task. In the present exemplary embodiment, once execution of the task is started, information representing whether processing has been completed or is ongoing is output from the task to the control section 62. Note that there is no limitation to this configuration of the present exemplary embodiment and, for example, an embodiment may be adopted in which information representing that processing is ongoing is not output, and only information representing that processing has been completed is output from the task to the control section 62.

In cases in which the task is an asynchronous task, information representing that processing is ongoing is output from the task at a time since execution of the task has just started. In such cases the control section 62 registers the asynchronous task for which processing is ongoing in the list 69 via the registration section 67. The list 69 in the present exemplary embodiment is an example of finish detection task management information of the present disclosure.

The asynchronous tasks registered in the list 69 are tasks each combined with a finish detection task (described in detail later) to detect the completion of the asynchronous processing. Hereinafter, an asynchronous task combined with the finish detection task are simply referred to as the "finish detection task". A finish detection task in a state in which the processing of the combined asynchronous task is ongoing is hereinafter referred to as an "ongoing finish detection task", and a finish detection task in a state in which the processing of the combined asynchronous task has been completed is referred to as a "completed finish detection task".

Figure 6A:
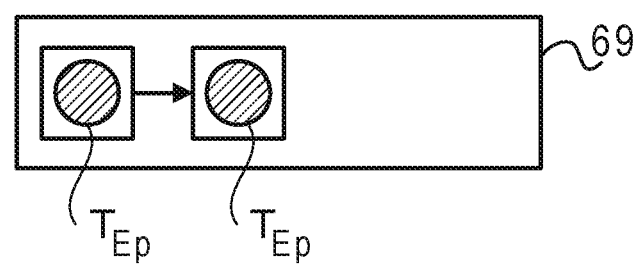
FIG. 6A is a schematic diagram to explain an asynchronous processing finish detection task list.

FIG. 6A illustrates an example of a state of the list 69. The example illustrated in FIG. 6A schematically illustrates a state in which there are already two ongoing finish detection tasks $TE_p$ registered in the list 69. The solid arrow illustrated in the list 69 expresses a direction from the head to the tail of the list 69. More specifically, the left side in FIG. 6A is the head of the list 69, and the right side abutting the tip of the arrow is the tail thereof.

Figure 6B:
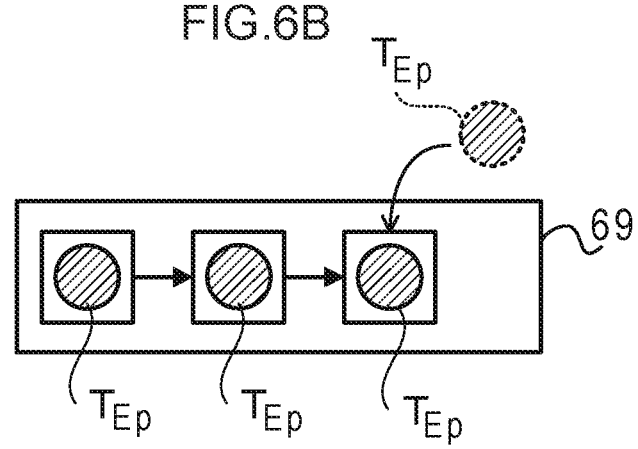
FIG. 6B is a schematic diagram to explain the asynchronous processing finish detection task list.

FIG. 6B schematically illustrates an example in which the registration section 67 registers a single new ongoing finish detection task $TE_p$ in the list 69. In order to register a finish detection task $TE_p$ in the list 69, for example as illustrated in FIG. 6B, the registration section 67 registers the finish detection task $TE_p$ at the tail of the list 69.

In cases in which the task is a synchronous task, information representing that the processing has been completed is output from the task. In such cases, prior to acquiring the next task from the task queue 64, the control section 62 causes the determination section 68 to execute list determination processing (described in detail later).

The determination section 68 scans the list 69 in sequence from the head, and investigates whether or not there is a completed finish detection task. In a case in which the determination section 68 has determined that there is a completed finish detection task present, the list 69 is updated by deleting the finish detection task determined to be completed by removing the finish detection task from the list 69.

Figure 7A:
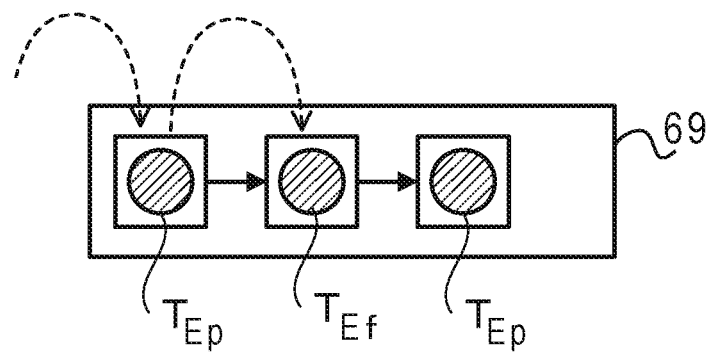
FIG. 7A is a schematic diagram to explain determination of the asynchronous processing finish detection task list.
Figure 7B:
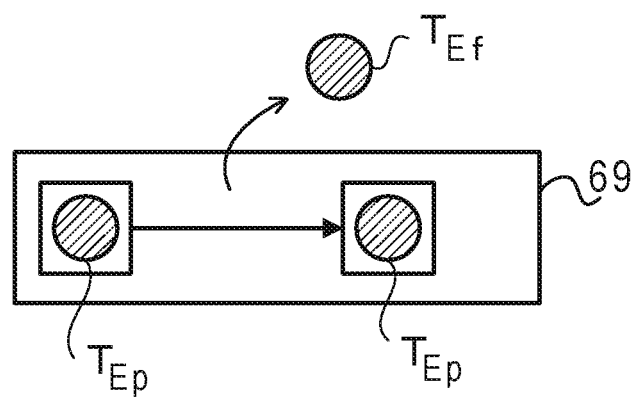
FIG. 7B is a schematic diagram to explain determination of the asynchronous processing finish detection task list.
Figure 7C:
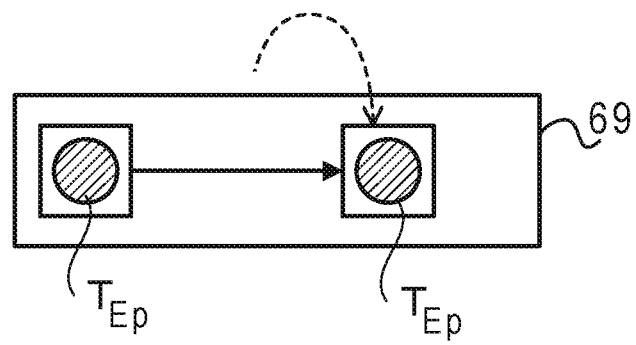
FIG. 7C is a schematic diagram to explain determination of the asynchronous processing finish detection task list.

FIG. 7A schematically illustrates an example of a state in which the determination section 68 has scanned the list 69 in sequence from the head, and has determined that the second finish detection task in the list 69 is a completed finish detection task TEL As illustrated in FIG. 7B, in a case in which it is determined that there is a completed finish detection task $T_{Ef}$, the determination section 68 updates the list 69 by deleting the finish detection task $T_{Ef}$ determined to be completed by removing it from the list 69. The determination section 68 then continues as illustrated in FIG. 7C by determining whether or not the next finish detection task in the sequence is a completed finish detection task $T_{Ef}$. The determination section 68 executes the above processing until the tail of the list 69 is reached.

The output section 66 according to the present exemplary embodiment outputs output image data obtained as a result of image processing executed by the image processing module 38 at the final stage of the image processing DAG 50B under control by the control section 62. In the present exemplary embodiment the output section 66 displays the output image represented by the obtained output image data on the display section 16. Alternatively, the output section 66 may output (transmit) the output image data to an external device. Or, in cases in which the computer 10 is incorporated in a printer, the output section 66 may output (or form) the output image represented by the output image data on a recording material such as paper or the like.

Figure 8:
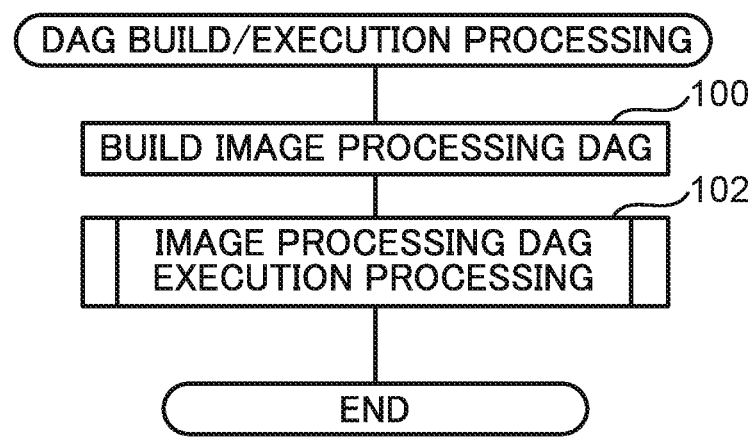
FIG. 8 is a flowchart illustrating an example of a flow of DAG build/execution processing according to the first exemplary embodiment.

Explanation next follows regarding operation of the computer 10 according to the present exemplary embodiment, with reference to FIG. 8 to FIG. 13. FIG. 8 is a flowchart illustrating an example of a flow of the DAG build/execution processing executed by the first processing unit 12A after input with an instruction to start execution of image processing by the application 32. A program (DAG build/execution processing program) for the DAG build/execution processing is pre-installed in the storage section 20. A core 13 in the first processing unit 12A that is not executing any task and is able to execute a task, functions as the processing build section 42 and the control section 62 described above by executing the DAG build/execution processing program.

At step 100 of FIG. 8, the processing build section 42 builds the image processing DAG 50A to perform image processing instructed by the application 32 in response to a build instruction from the application 32. The processing build section 42 updates the image processing DAG 50A to produce the image processing DAG 50B as described above.

At the next step 102, the control section 62 executes the image processing DAG execution processing in which image processing according to the image processing DAG 50B built at step 100 is executed by the first processing unit 12A (the cores 13) and the second processing unit 12B, and then ends the present DAG build/execution processing.

The results of the image processing desired by the application 32 are obtained from the output section 66 by executing the present DAG build/execution processing. In the present exemplary embodiment, in cases in which the present DAG build/execution processing has been terminated, the control section 62 notifies the application 32 with information representing that the processing has been completed, or in cases in which any error has occurred during processing, with information representing this situation.

Detailed explanation next follows regarding the image processing DAG execution processing of step 102 in the DAG build/execution processing described above. Two types of processing are included in the DAG build/execution processing of the present exemplary embodiment: task storage processing to store an executable task of the image processing DAG 50B in the task queue 64; and task execution processing to execute a task stored in the task queue 64.

Figure 9:
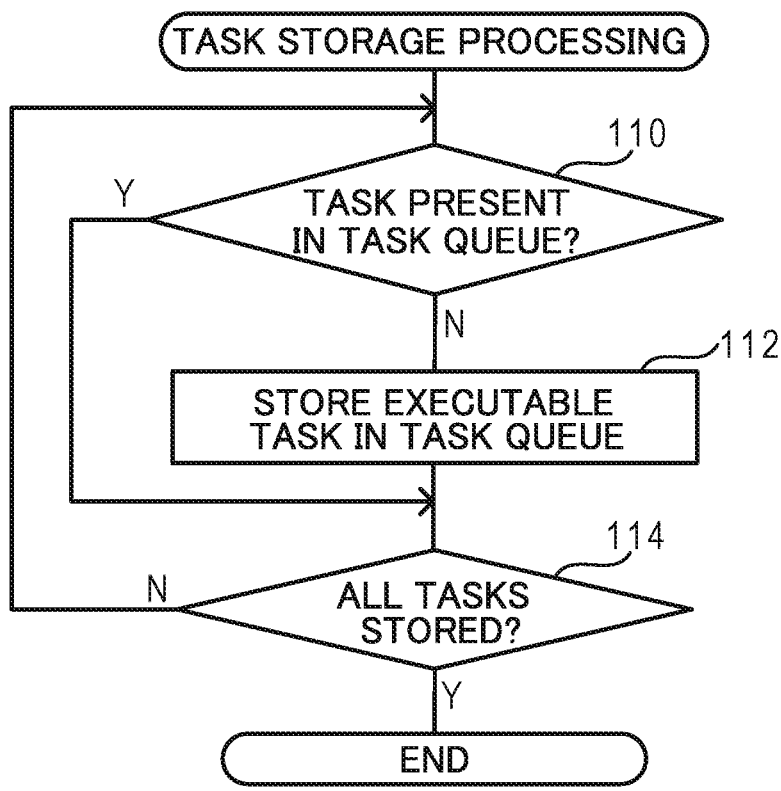
FIG. 9 is a flowchart illustrating an example of flow of a task storage processing according to the first exemplary embodiment.

Explanation first follows regarding the task storage processing, with reference to FIG. 9. FIG. 9 is a flowchart illustrating an example of a flow of task storage processing. In the present exemplary embodiment a program for task storage processing (a task storage processing program) is a portion of the DAG build/execution processing program, or is pre-installed separately on the storage section 20 as a sub-program.

A core 13 in the first processing unit 12A that is not executing a task and is able to execute a task functions as the control section 62 and executes the task storage processing illustrated in FIG. 9 by executing the task storage processing program.

At step 110 of FIG. 9, the control section 62 determines whether or not executable tasks are stored in the task queue 64. In the present exemplary embodiment, determination at step 110 is affirmative in a case in which there are two or more executable tasks stored in the task queue 64, and processing transitions to step 114.

However, determination at step 110 is negative in a case in which there are less than two executable tasks stored in the task queue 64, and processing transitions to step 112.

Figure 10:
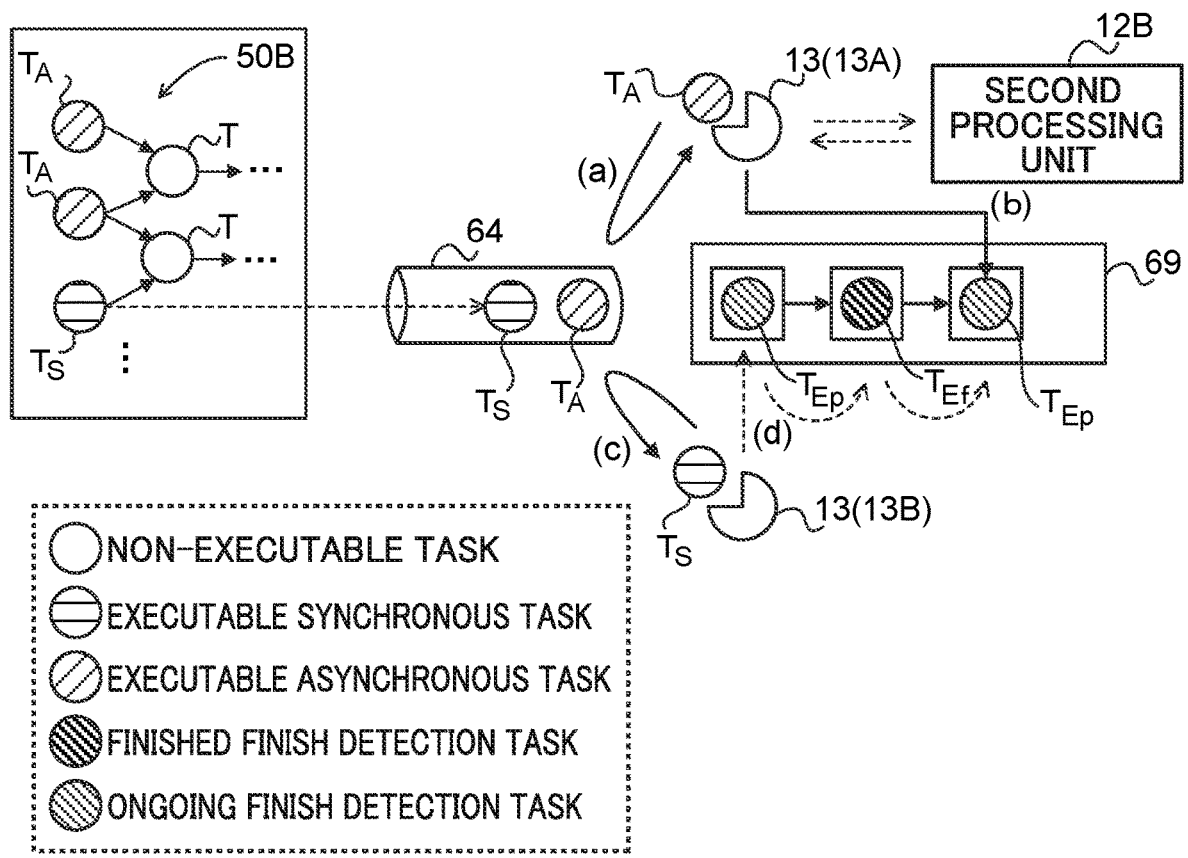
FIG. 10 is a schematic diagram to explain image processing DAG execution processing according to the first exemplary embodiment.

At step 112, the control section 62 finds an executable task in the image processing DAG 50B and stores the found executable task in the task queue 64. FIG. 10 illustrates an example of a state in which the control section 62 has stored an executable synchronous task $T_s$ of the image processing DAG 50B in the task queue 64 already storing an executable asynchronous task $T_A$.

In cases of storing tasks, as stated above, the number of tasks stored in the task queue 64 may be at most two, and the number of tasks stored by the control section 62 at the same time in the task queue 64 at the present step may be one or two. More specifically, the control section 62 may store one or two tasks in the task queue 64 if there is no task stored in the task queue 64, or the control section 62 may store one task in the task queue 64 if there is already one task stored in the task queue 64. The number of tasks the control section 62 stores in the task queue 64 at the same time in the present step may be predetermined, or may be varied according to progress in task processing in each of the cores 13.

Next at step 114, the control section 62 determines whether or not all of the tasks in the image processing DAG 50B have been stored in the task queue 64. The determination at step 114 is negative in a case in which there are still tasks not yet stored in the task queue 64, and processing returns to step 110 and the present task storage processing is repeated. However, the determination at step 114 is affirmative in a case in which all of the tasks have already been stored in the task queue 64, and the present task storage processing is ended.

Figure 11:
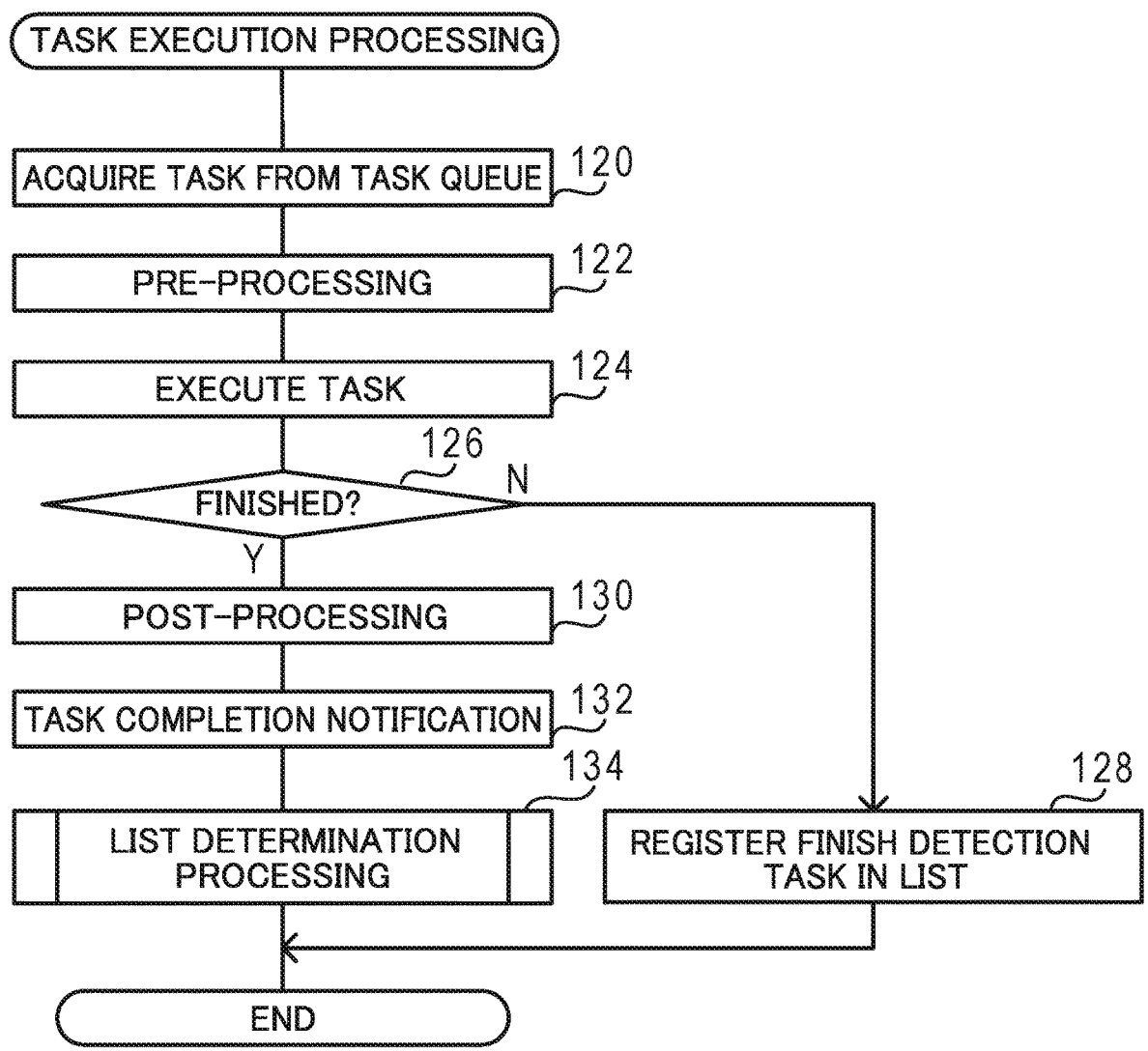
FIG. 11 is a flowchart illustrating an example of a flow of task execution processing according to the first exemplary embodiment.

Next, explanation follows regarding task execution processing, with reference to FIG. 11. FIG. 11 is a flowchart illustrating an example of a flow of task execution processing. In the present exemplary embodiment, a program for task execution processing (task execution processing program) is a portion of the DAG build/execution processing program, or is pre-installed separately on the storage section 20 as a sub-program.

Each of the cores 13 in the first processing unit 12A not executing a task and able to execute a task may function as the control section 62, the registration section 67, and the determination section 68 by executing the task execution processing program, and the task execution processing illustrated in FIG. 11 is accordingly executed. In the present exemplary embodiment, the task storage processing and the task execution processing are executed in parallel by executing the task storage processing and the task execution processing with different cores 13.

At step 120 of FIG. 11, the control section 62 acquires a task from the task queue 64.

Next at step 122, the control section 62 executes predetermined pre-processing in task execution. The pre-processing executed in the present step is predetermined processing performed prior to the image processing, and there is no particular limitation thereto. For example, the pre-processing may be processing performed to secure an output buffer area to store image processing results, or to secure resources for computation such as to initialize variables employed in image processing.

At the next step 124, the control section 62 causes a core 13 of the first processing unit 12A or the second processing unit 12B to execute the task acquired at step 120. In a case in which the task is executed in the second processing unit 12B, the core 13 of the first processing unit 12A performs processing to cause the second processing unit 12B to execute the task so that the task is executed by the second processing unit 12B. The task executed by the second processing unit 12B of the present exemplary embodiment is an example of an execution instruction task of the present disclosure.

Information representing whether or not a task is a task for execution on the second processing unit 12B is appended in processing by the processing build section 42 to generate the image processing DAG 50B from the image processing DAG 50A at step 100 of the DAG build/execution processing (see FIG. 8).

At the next step 126 the control section 62 determines whether or not the task executed at step 124 has been completed.

Figure 13A:
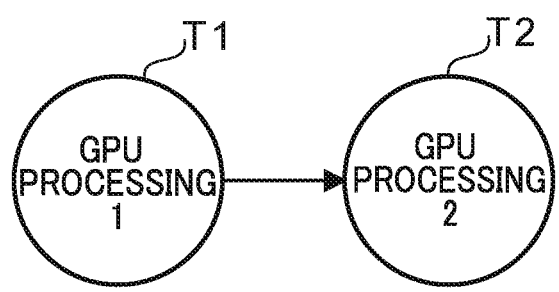
FIG. 13A is a schematic diagram illustrating an example of a flow of processing in a case in which two GPU processing tasks are performed in succession.
Figure 13B:
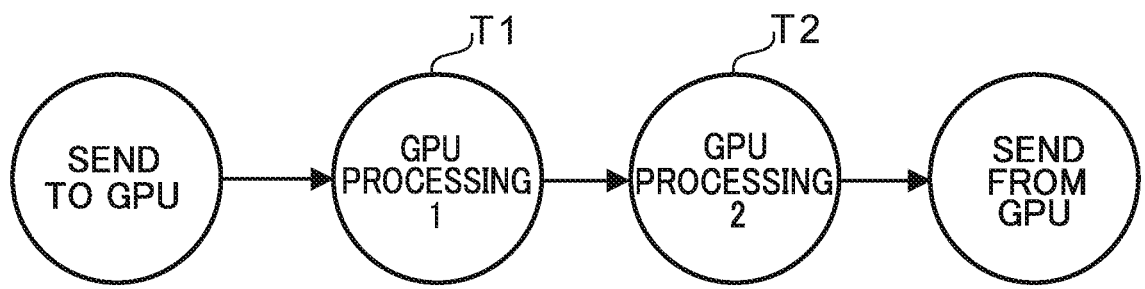
FIG. 13B is a schematic diagram illustrating an example of a flow of processing in a case in which processing is performed by a second processing unit (GPU) in synchronization with the core of a first processing unit.

Cases in which the task is a task for execution on the second processing unit 12B (see arrow (a) in FIG. 10), data (image data) required for processing is generally send to the local memory 15 of the second processing unit 12B in order to perform processing at high speed. Explanation follows regarding a specific example of a case in which the second processing unit 12B is a GPU. As an example, in a case in which GPU processing tasks T1, T2 are to be performed in succession as illustrated in FIG. 13A, send processing from the memory 14 to the local memory 15 of the second processing unit 12B is performed prior to execution of task T1 and send processing of processing results from the local memory 15 to the memory 14 is performed after execution of task T2, as illustrated in FIG. 13B.

As described above, the GPU is activated and controlled by the core 13 executing a task and instructing the GPU, thereby the task is executed by the GPU. In cases in which synchronous processing (i.e., processing in which control does not return to the core 13 until the processing in the GPU is completed) as illustrated in the example of FIG. 13B is performed, the configuration is the same as in cases in which a task executed by an ordinary CPU. However, inefficiencies occur in the operation of the core 13 because the core 13 adopts a standby state during the GPU processing 1 and the GPU processing 2 in FIG. 13B until these processing are completed.

In cases in which asynchronous processing (i.e., processing in which, after the core 13 instructs the GPU to execute processing, control returns to the core 13 without waiting until the processing is completed) illustrated in the example of FIG. 13C is performed, the core 13 is able to execute separate tasks in parallel to the GPU processing 1 and the GPU processing 2, thereby the utilization ratio is improved.

In cases of the asynchronous processing, there is a need to detect the finish of tasks being executed by the GPU (e.g., tasks T1 and T2 in FIG. 13C). Thus, as illustrated in FIG. 13C, the core 13 instructs each task of sending a task to the GPU, processing, and sending of processing results from the GPU (i.e., tasks T0 to T3) for processing asynchronously. After the control returns to the core 13, the core 13 executes finish detection task T4 to detect the completion of the tasks in the GPU.

In this case, there is hardly any processing that is completed at the timing when step 124 is executed. The determination at step 126 is negative in a case in which processing is not completed and processing transitions to step 128.

At step 128, the control section 62 ends the present task execution processing after the finish detection task T4 has been registered by the registration section 67 at the tail of the list 69.

The example of FIG. 10 illustrates a state in which the core 13A that has caused the second processing unit 12B to execute the asynchronous task $T_A$ t has registered the finish detection task $T_{Ep}$ thereof at the tail of the list 69 already registered with the two finish detection tasks $TE_p$, $T_{Ef}$ (see arrow (b) in FIG. 10).

In a case in which the task is a task to be executed in the first processing unit 12A (see arrow (c) in FIG. 10), execution in the core 13 is performed by synchronous processing, and control does not return to the control section 62 until the synchronous processing has been completed. Thus, at the determination of step 126 after control has returned to the control section 62, the determination of step 126 is affirmative since the synchronous processing has been completed, and processing transitions to step 130.

The control section 62 performs post-processing at step 130. The post-processing executed at the present step is predetermined processing to be performed after the sub-processing routine corresponding to the task, and there is no particular limitation thereto. For example, the post-processing may be processing performed such as to release resources for computation secured in the processing of step 122.

At the next step 132, the control section 62 performs task completion notification to the processing build section 42. After receipt of the task completion notification, the processing build section 42 updates the dependency relationships in the image processing DAG 50B. After the dependency relationships of the image processing DAG 50B are updated in this way, the processing build section 42 determines executable tasks by the task storage processing (see FIG. 9) described above based on the updated dependency relationships.

At the next step 134, the control section 62 ends the present task execution processing after executing the list determination processing to perform determination on the finish detection tasks registered in the list 69 by the determination section 68.

Next, detailed explanation follows regarding the list determination processing of step 134 of the task execution processing described above (see FIG. 11), with reference to FIG. 12. FIG. 12 is a flowchart illustrating an example of a flow of the list determination processing.

At step 150 the determination section 68 acquires the finish detection task registered at the head of the list 69.

At the next step 152 the determination section 68 determines whether or not acquisition of the finish detection task has been successful. The determination at step 152 is negative in a case in which the list 69 is empty and a finish detection task could not be acquired, and the present list determination processing is ended.

The determination at step 152 is affirmative in a case in which a finish detection task has been successfully acquired, and processing transitions to step 154.

At step 154 the determination section 68 determines whether or not the asynchronous processing corresponding to the acquired finish detection task has been completed. The determination at step 154 is negative in a case in which the asynchronous processing is ongoing and the completion of the asynchronous processing is not yet detected by the finish detection task, for example as in the example of FIG. 10 in which the finish detection task acquired by the determination section 68 is the finish detection task $T_{Ep}$. Processing then transitions to step 162. At step 162 the determination section 68 acquires the next registered finish detection task from the list 69, and then processing returns to step 152.

The determination at step 154 is affirmative in a case in which the asynchronous processing has been completed and the completion of the asynchronous processing has been detected by the corresponding finish detection task, for example as in the example of FIG. 10 in which the finish detection task acquired by the determination section 68 is the completed finish detection task $T_{Ef}$, and processing transitions to step 156.

At step 156, the determination section 68 removes and deletes the finish detection task that has been completed from the list 69 (see also FIG. 7B).

At the next step 158, the determination section 68 performs similar post-processing to that performed at step 130 of the task execution processing described above (see FIG. 11). At the next step 160, the determination section 68 notifies the processing build section 42 of completion of the task similarly to at step 132 of the task execution processing described above.

At the next step 162, the determination section 68 acquires the next registered finish detection task from the list 69, and then processing returns to step 152.

Namely, the control section 62 scans the list 69 in sequence from the head to the tail, and for each of the finish detection tasks executes determination as to whether or not the combined asynchronous processing has been completed. The arrow (d) of FIG. 10 illustrates an example of a case in which the core 13B that completed the processing of synchronous task Ts scans the list 69 in sequence from the head to the tail, in which the second registered finish detection task is the completed finish detection task $T_{Ef}$.

In this way, in the present exemplary embodiment, a core 13 that instructs execution of processing of the asynchronous task to the second processing unit 12B with execution of the task not being completed registers a finish detection tasks in the list 69. Moreover, a core 13 that has completed executing a task performs list determination processing, deletes finish detection tasks that are completed from the list 69, and also performs post-processing of the corresponding asynchronous task and performs task completion notification to the processing build section 42.

In the present exemplary embodiment, management of finish detection tasks is performed using the list 69, thereby enabling detection of the completion of asynchronous tasks executed by the second processing unit 12B to be performed efficiently. The present exemplary embodiment thereby enables the second processing unit 12B to be operated efficiently, and enables parallel processing with high scalability to be realized.

In a case in which there is no longer a task stored in the task queue 64 by the task storage processing (see FIG. 9) while there is one or more finish detection task registered in the list 69, the finish detection task registered in the list 69 may be stored in the task queue 64. This thereby prevents the core 13 from entering a standby state and deadlock occurring.

Obviously, in the present exemplary embodiment, each of processing to update the image processing DAG 50B, to store a task in the task queue 64, and to fetch a task from the task queue 64 needs to be performed under exclusive control.

Second Exemplary Embodiment

In the present exemplary embodiment, explanation follows regarding an embodiment in which in order to avoid congestion, exclusive control is adopted for access to the list 69 to perform each processing of registering a finish detection task, scanning for completion determination, and deleting tasks. Note that configuration and operation similar to that of the first exemplary embodiment will be noted and detailed explanation thereof will be omitted.

The configuration of the computer 10 of the present exemplary embodiment is similar to the configuration of the computer 10 of the first exemplary embodiment (see FIG. 1 and FIG. 3), and detailed explanation thereof will be omitted.

In the present exemplary embodiment, the task storage processing in the DAG build/execution processing executed by the computer 10 (see FIG. 8) is similar to that of the task storage processing of the first exemplary embodiment (see FIG. 9), and explanation thereof will be omitted. However, the task execution processing includes processing different to the task execution processing of the first exemplary embodiment (see FIG. 11), so a detailed explanation follows regarding the task execution processing of the present exemplary embodiment.

Figure 14:
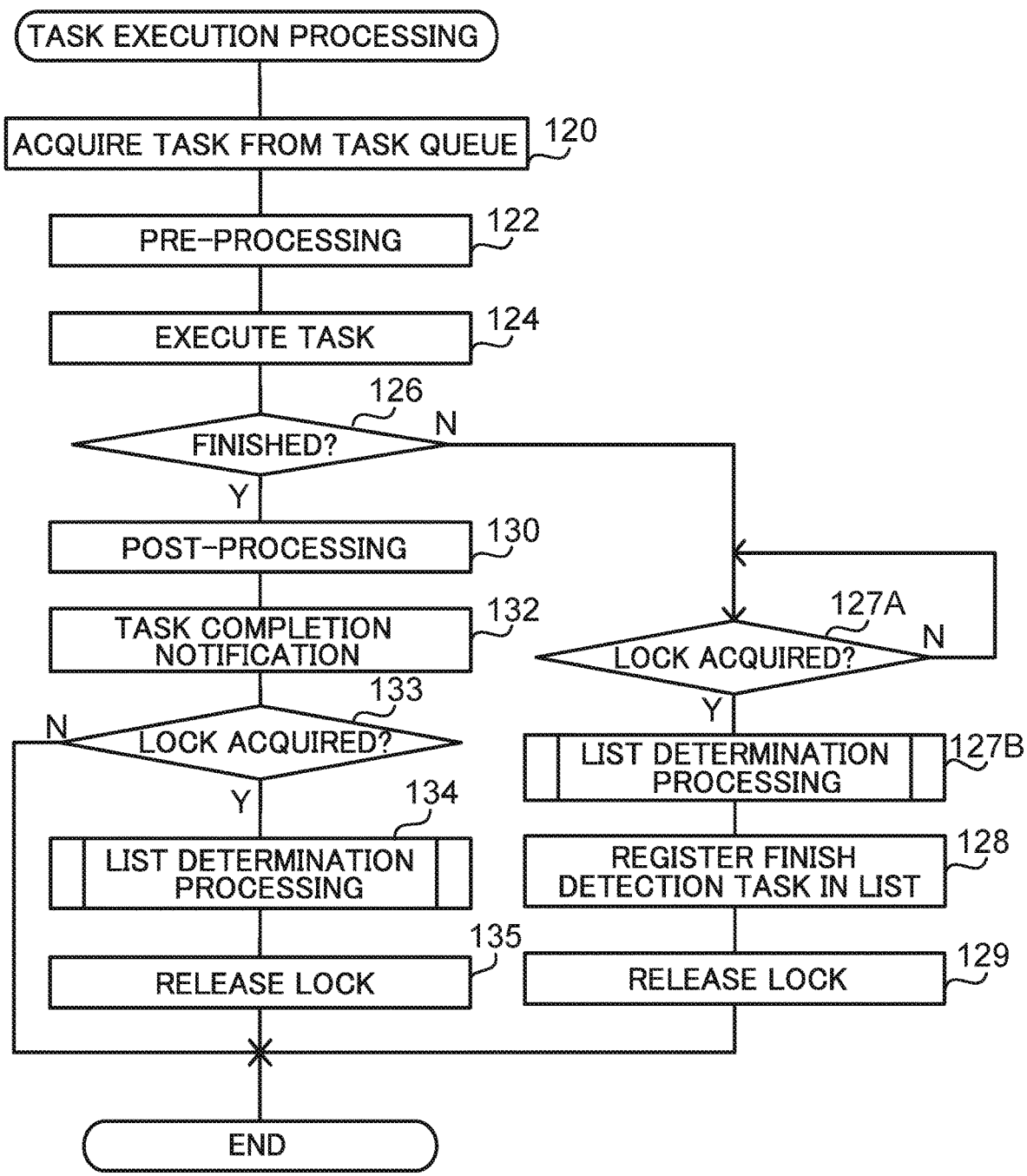
FIG. 14 is a flowchart illustrating an example of flow of a task execution processing according to a second exemplary embodiment.

FIG. 14 is a flowchart illustrating an example of flow of the task execution processing of the present exemplary embodiment. As illustrated in FIG. 14, the task execution processing of the present exemplary embodiment differs from the task execution processing of the first exemplary embodiment (see FIG. 11) in that it includes the processing of steps 127A and 127B between step 126 and step 128, and includes the processing of step 129 after step 128.

In the present exemplary embodiment, in a case in which negative determination is made at step 126, processing transitions to step 127A. At step 127A, the control section 62 determines whether or not an exclusive control lock to access the list 69 has been successfully acquired. The determination of step 127A is negative until the lock is successfully acquired, the determination at step 127A becomes affirmative in a case in which the lock is successfully acquired, and processing transitions to step 127B.

At step 127B, the control section 62 causes the determination section 68 to perform list determination processing, similar to the processing at step 134 of the task execution processing of the first exemplary embodiment as described above, and then processing transitions to step 128. As described above for step 128, after the finish detection task has been registered at the tail of the list 69 by the registration section 67, processing transitions to step 129.

At step 129, the control section 62 releases the acquired lock and then ends the present task execution processing.

As illustrated in FIG. 14, the task execution processing of the present exemplary embodiment also differs from the task execution processing of the first exemplary embodiment (see FIG. 11) in that it includes the processing of step 133 between step 132 and step 134, and includes the processing of step 135 after the processing of step 134.

At step 133, the control section 62 determines whether or not an exclusive control lock to access the list 69 has been successfully acquired. The determination at step 133 is negative in a case in which the lock has not been successfully acquired, and the present task execution processing is ended. However, the determination at step 133 is affirmative in a case in which the lock has been successfully acquired and processing transitions to step 134.

At step 135, the control section 62 releases the acquired lock and then ends the present task execution processing.

In this way, in the computer 10 of the present exemplary embodiment, the core 13 registering the finish detection task in the list 69 adopts a standby state until the lock to access the list 69 is successfully acquired, and after performing the list determination processing after acquiring the lock, then registers the finish detection task in the list 69. The core 13 that has received a task completion notification performs the list determination processing after the lock to access the list 69 has been acquired, and does not perform the list determination processing while not being able to acquire the lock.

In contrast to the present exemplary embodiment, in a case in which an exclusive control is simply adopted to access the list 69, if there are plural cores 13 to be executing the list determination processing and the timings at which the cores 13 access the list 69 overlap, while one of the cores 13 is accessing the list 69, the other cores 13 would be blocked. In such a configuration inefficiencies would occur in the operation of the blocked cores 13. Since the core 13 that has acquired the lock to access the list 69 scans all of the finish detection tasks in the list 69 during the list determination processing, there is no need for the list determination processing to be performed by the other cores 13.

Thus, in the present exemplary embodiment, a core 13 that has not been able to acquire the lock does not perform the list determination processing, thereby increasing processing efficiency, and enabling inefficiencies in the operation of the core 13 to be suppressed from occurring.

Moreover, the core 13 to perform the list determination processing is blocked while the core 13 to perform registration of the finish detection task has acquired the lock to the list 69. In contrast to the present exemplary embodiment, in a case in which only blocking of the core 13 performing the list determination processing is performed, then determination of completed finish detection tasks would be delayed, and a new asynchronous task would not be able to be performed in the second processing unit 12B, with inefficiencies occurring in the operation of the second processing unit 12B.

Thus, in the present exemplary embodiment, after the core 13 to perform finish detection task registration has acquired the lock to the list 69, this core 13 also performs the list determination processing, so that the determination of completed finish detection tasks can be performed more efficiently. The present exemplary embodiment accordingly enables the second processing unit 12B to be operated more efficiently, enabling parallel processing with high scalability to be realized.

Third Exemplary Embodiment

Explanation follows regarding a configuration in which the list determination processing is treated as being a single task in the present exemplary embodiment. Note that configuration and operation similar to that of the first exemplary embodiment will be noted and detailed explanation thereof will be omitted.

The configuration of the computer 10 of the present exemplary embodiment is similar to the configuration of the computer 10 of the first exemplary embodiment (see FIG. 1 and FIG. 3), so detailed explanation thereof will be omitted.

In the present exemplary embodiment, the task storage processing in the DAG build/execution processing (see FIG. 8) executed by the computer 10 is similar to the task storage processing of the first exemplary embodiment (see FIG. 9), so detailed explanation thereof will be omitted. However, the task execution processing includes processing different to the task execution processing of the first exemplary embodiment (see FIG. 11), so a detailed explanation follows regarding the task execution processing of the present exemplary embodiment.

Figure 15:
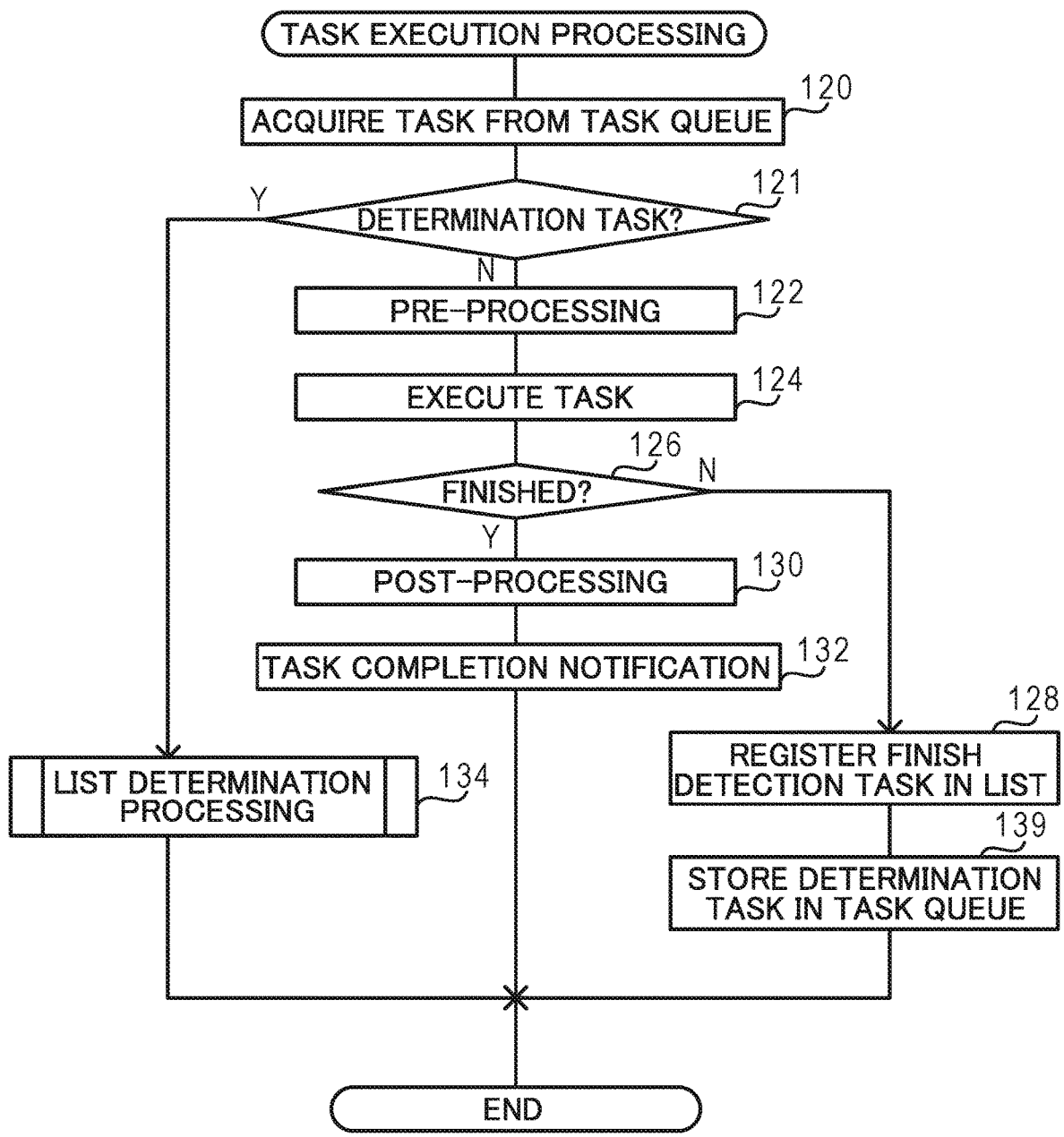
FIG. 15 is a flowchart illustrating an example of flow of a task execution processing according to a third exemplary embodiment.

FIG. 15 is a flowchart illustrating an example of flow of the task execution processing of the present exemplary embodiment. As illustrated in FIG. 15, the task execution processing in the present exemplary embodiment differs from the task execution processing of the first exemplary embodiment (see FIG. 11) in that it includes the processing of step 139 after the processing of step 128.

Figure 16:
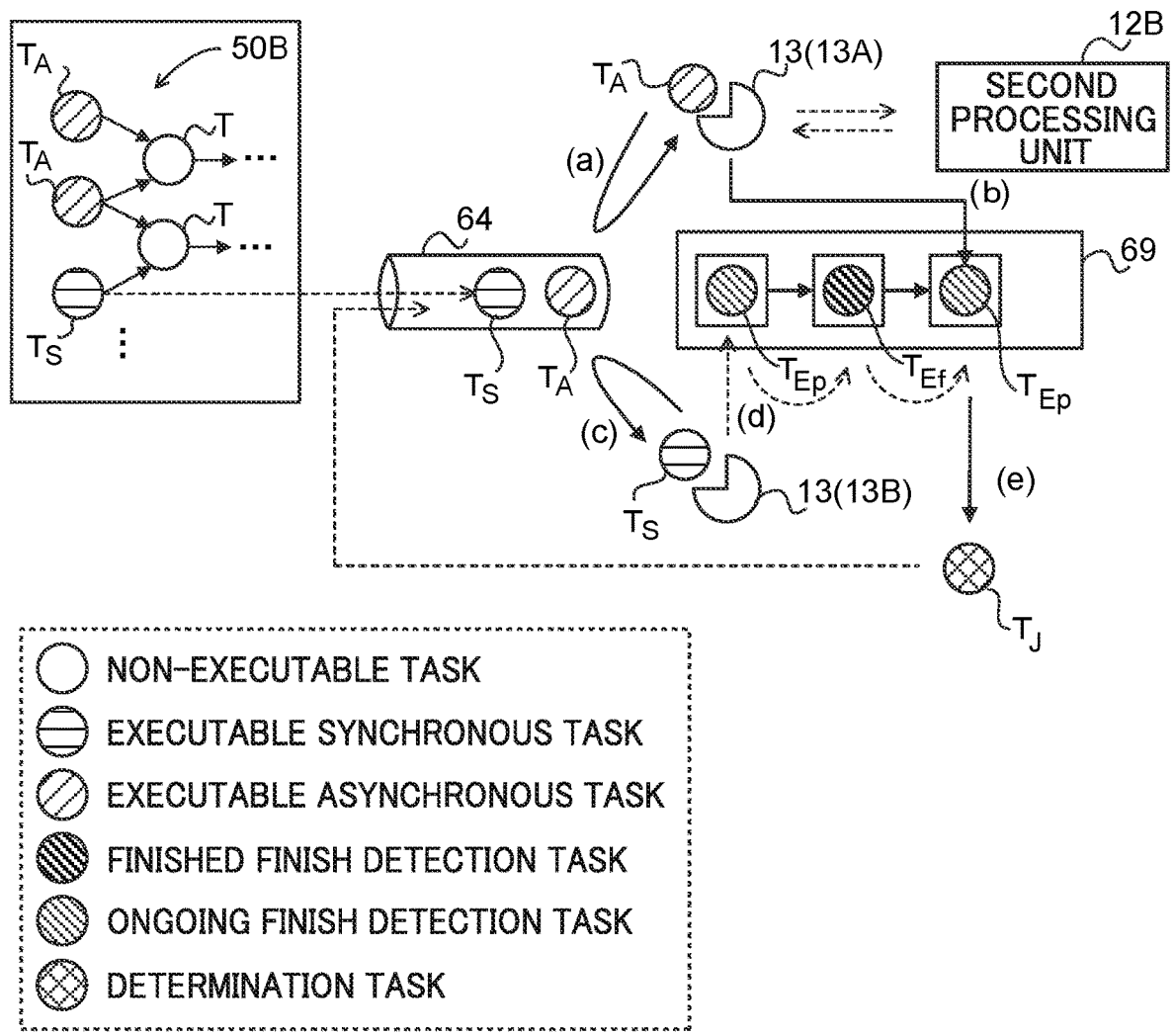
FIG. 16 is a schematic diagram to explain image processing DAG execution processing according to the third exemplary embodiment.

After the finish detection task has been registered in the list 69, at step 139 the control section 62 stores the determination task to perform the list determination processing in the task queue 64 and then ends the present task execution processing. The example illustrated in FIG. 16 illustrates a state in which the core 13A that has stored the finish detection task $T_{Ep}$ in the list 69 stores a determination task $T_J$ in the task queue 64 (see arrow (e)).

Moreover, the task execution processing of the present exemplary embodiment as illustrated in FIG. 15 differs from the task execution processing of the first exemplary embodiment (see FIG. 11) in that it includes processing of step 121 between step 120 and step 122, and in that the timing to execute the processing of step 134.

At step 121, the control section 62 determines whether or not the acquired task is a determination task. The determination at step 121 is negative in a case in which the acquired task is not a determination task, and processing transitions to step 122. However, the determination at step 121 is affirmative in a case in which the acquired task is a determination task. Processing transitions to step 134, the list determination processing is executed, and then the present task execution processing is ended. Note that in the present exemplary embodiment, the present task execution processing is ended after performing task completion notification to the processing build section 42 at step 132.

In this way, in the present exemplary embodiment, by storing the determination task to perform list determination processing in the task queue 64, the timing to perform list determination processing is the timing at which the core 13 has acquired the determination task from the task queue 64.

In the present exemplary embodiment, plural finish detection tasks are integrally managed using the list 69, and the list determination processing is executed only once to determine whether or not a task is a completed finish detection task for all of the finish detection tasks registered in the list 69. This thereby enables determination of completed finish detection tasks to be achieved more efficiently than, for example, cases in which individual finish detection tasks are stored in the task queue 64. The present exemplary embodiment is thereby able to operate the second processing unit 12B efficiently, enabling parallel processing with high scalability to be realized.

As described above, the computer 10 of each of the exemplary embodiments is configured to execute image processing using each object in an object group of plural connected objects for executing image processing arranged in a directed acyclic graph pattern. The computer 10 includes a subdividing section 60, a control section 62, a registration section 67, and a determination section 68. The subdividing section 60 subdivides the image data subject to image processing into plural subdivided image data. The control section 62 controls each of plural cores 13 provided in a first processing unit 12A so as to execute in parallel tasks of image processing to be performed on the subdivided image data, while the tasks being enabled for processing according to precedence dependency relationships. In cases in which a task is executable by a second processing unit 12B asynchronously with respect to the first processing unit 12A, after an execution instruction task instructing execution of the task on the second processing unit 12B has been executed on the core 13 of the first processing unit 12A, the registration section 67 registers a finish detection task to detect the completion of the task by the second processing unit 12B on a list 69. The determination section 68 accesses the list 69 and determines whether or not the completed finish detection task is a task that the second processing unit 12B has completed its task.

In each of the exemplary embodiments such as those described above, the core 13 that instructed execution of asynchronous task processing to the second processing unit 12B registers a finish detection task in the list 69. The core 13 also performs deletion of completed finish detection tasks from the list 69 by list determination processing and performs task completion notification to the processing build section 42.

In contrast thereto, in cases differing from the exemplary embodiments described above, in which finish detection tasks are stored in a task queue 64, even though execution of tasks stored ahead of the finish detection task has been completed, a new task is not able to be performed by the second processing unit 12B until the finish detection task is acquired from the task queue 64, irrespective of whether or not the second processing unit 12B has completed its task execution. The second processing unit 12B is accordingly not able to be sufficiently utilized, lowering the processing efficiency of image processing.

However, in the exemplary embodiments described above, detection of completion of asynchronous tasks executed by the second processing unit 12B may be performed efficiently due to managing plural finish detection tasks using the list 69. Thus, in the exemplary embodiments described above, the second processing unit 12B may be utilized efficiently, enabling parallel processing with high scalability to be realized.

Thus, the computer 10 of each of the exemplary embodiments described above enables faster image processing due to performing detection of the completion of tasks in the second processing unit 12B more efficiently.

In each of the exemplary embodiments described above, explanation has been given regarding cases in which the second processing unit 12B is inbuilt into the computer 10. However, the embodiments are not limited to this and the second processing unit 12B may be provided outside the computer 10, or may be provided in a different computer to the computer 10.

Moreover, although in each of the exemplary embodiments described above explanation has been given regarding a mode in which various programs are pre-stored (installed) on the storage section 20, there is no limitation thereto. The various programs may be provided in a format recorded on a recording medium such as a CD-ROM, digital versatile disk read only memory (DVD-ROM), universal serial bus (USB), or the like. The various programs may be provided in a format downloadable from an external device over a network.

All publications, patent applications and technical standards mentioned in the present specification are incorporated by reference in the present specification to the same extent as if each individual publication, patent application, or technical standard was specifically and individually indicated to be incorporated by reference.

What is claimed is:

1. An image processing device configured to execute image processing using respective objects in an object group of a plurality of connected objects for executing image processing arranged in a directed acyclic graph pattern, the image processing device comprising:
    a memory; and
    first and second processors coupled to the memory, the first processor including a plurality of arithmetic logic units and being configured to serve as:
    a subdividing section configured to subdivide image data subject to the image processing into a plurality of subdivided image data;
    a control section configured to control each of the plurality of arithmetic logic units included in the first processor so as to execute, in parallel, a sub-processing routine of the image processing to be performed on the subdivided image data, one or more sub-processing routines being included in an object, and the sub-processing routine being enabled for processing according to a precedence dependency relationship of the one or more sub-processing routines;
    a registration section configured to, in a case in which a sub-processing routine that is an asynchronous processing routine to be performed asynchronously with respect to the first processor and that is associated with a finish detection task for detecting completion of the sub-processing routine, is executable by the second processor, after causing an arithmetic logic unit of the first processor to execute an execution instruction task instructing execution of the sub-processing routine at the second processor, register, in finish detection task management information, the finish detection task associated with the sub-processing routine of which execution has been instructed; and
    a determination section configured to access the finish detection task management information and to execute the finish detection task registered in the finish detection task management information to determine whether or not there is a completed finish detection task associated with a sub-processing routine of which the second processor has completed execution.

2. The image processing device of claim 1, wherein one of the plurality of arithmetic logic units operates as the determination section after executing the sub-processing routine.

3. The image processing device of claim 2, wherein, after determining, as the determination section, whether or not there is a completed finish detection task, the one of the plurality of arithmetic logic units executes another sub-processing routine under control by the control section.

4. The image processing device of claim 1, wherein one of the plurality of arithmetic logic units operates as the registration section.

5. The image processing device of claim 1, wherein one of the plurality of arithmetic logic units successively operates as the registration section and as the determination section.

6. The image processing device of claim 1, wherein the control section causes one of the plurality of arithmetic logic units to execute a determination task so that the one of the arithmetic logic units operates as the determination section.

7. The image processing device of claim 1, wherein the control section performs exclusive control on access by the registration section and the determination section to the finish detection task management information.

8. The image processing device of claim 1, wherein the determination section deletes the completed finish detection task from the finish detection task management information.

9. The image processing device of claim 1, wherein the control section causes the plurality of arithmetic logic units to fetch one or more sub-processing routines stored in a task queue in sequence and to execute the one or more sub-processing routines in parallel.

10. An image processing method performed by an image processing device configured to execute image processing using respective objects in an object group of a plurality of connected objects for executing image processing arranged in a directed acyclic graph pattern, the image processing method comprising:
    subdividing image data subject to the image processing into a plurality of subdivided image data;
    executing, in parallel, by each of a plurality of arithmetic logic units included in a first processing unit, a sub-processing routine of the image processing to be performed on the subdivided image data, one or more sub-processing routines being included in an object, and the sub-processing routine being enabled for processing according to a precedence dependency relationship of the one or more sub-processing routines;
    in a case in which a sub-processing routine that is an asynchronous processing routine to be performed asynchronously with respect to the first processing unit and that is associated with a finish detection task for detecting completion of the sub-processing routine is executable by a second processing unit, after causing an arithmetic logic unit of the first processing unit to execute an execution instruction task instructing execution of the sub-processing routine at the second processing unit, registering, in finish detection task management information, the finish detection task associated with the sub-processing routine of which execution has been instructed; and
    accessing the finish detection task management information and executing the finish detection task registered in the finish detection task management information to determine whether or not there is a completed finish detection task associated with a sub-processing routine of which the second processing unit has completed execution.

11. A non-transitory storage medium storing an image processing program that causes a computer to perform image processing using respective objects in an object group of a plurality of connected objects for executing image processing arranged in a directed acyclic graph pattern, the image processing comprising:
    subdividing image data subject to the image processing into a plurality of subdivided image data;

executing in parallel, by each of a plurality of arithmetic logic units included in a first processing unit, a sub-processing routine of the image processing to be performed on the subdivided image data, one or more sub-processing routines being included in an object, and the sub-processing routine being enabled for processing according to a precedence dependency relationship of the one or more sub-processing routines;

in a case in which a sub-processing routine that is an asynchronous processing routine to be performed asynchronously with respect to the first processing unit and that is associated with a finish detection task for detecting completion of the sub-processing routine is executable by a second processing unit, after causing an arithmetic logic unit of the first processing unit to execute an execution instruction task instructing execution of the sub-processing routine at the second processing unit, registering, in finish detection task management information, the finish detection task associated with the sub-processing routine of which the execution has been instructed; and accessing the finish detection task management information and executing the finish detection task registered in the finish detection task management information to determine whether or not there is a completed finish detection task associated with a sub-processing routine of which the second processing unit has completed execution.

\* \* \* \* \*